(12) United States Patent
Mighell et al.

(10) Patent No.: US 11,407,466 B2
(45) Date of Patent: Aug. 9, 2022

(54) TILTING WHEELED VEHICLE

(71) Applicant: ARCIMOTO, INC., Eugene, OR (US)

(72) Inventors: Robert Mighell, Snohomish, WA (US); Michael R. Lowell, Snohomish, WA (US)

(73) Assignee: ARCIMOTO, INC., Eugene, OR (US)

( * ) Notice: Subject to any disclaimer, the term of this patent is extended or adjusted under 35 U.S.C. 154(b) by 0 days.

(21) Appl. No.: 15/291,055

(22) Filed: Oct. 11, 2016

(65) Prior Publication Data

US 2021/0331762 A1 Oct. 28, 2021

Related U.S. Application Data

(63) Continuation-in-part of application No. 14/589,734, filed on Jan. 5, 2015, now abandoned, which is a continuation of application No. 13/460,282, filed on Apr. 30, 2012, now abandoned, which is a
(Continued)

(51) Int. Cl.
*B62K 5/10* (2013.01)
*B62K 5/05* (2013.01)

(52) U.S. Cl.
CPC . *B62K 5/10* (2013.01); *B62K 5/05* (2013.01)

(58) Field of Classification Search
CPC ... B62D 9/02; B62D 9/04; B62K 5/02; B62K 5/10; B62K 5/027; B62K 5/08; B62K 2005/001; B60G 21/007; B60G 2300/45
See application file for complete search history.

(56) References Cited

U.S. PATENT DOCUMENTS

| 1,041,097 A | 10/1912 | Kennedy |
| 1,954,361 A * | 4/1934 | Lewter ...................... B60R 9/06 280/402 |
| 2,622,896 A | 12/1952 | Wilkinson |

(Continued)

FOREIGN PATENT DOCUMENTS

| DE | 3546073 A1 | 7/1987 | |
| GB | 2407541 A * | 5/2005 | ............... B62D 9/02 |

(Continued)

OTHER PUBLICATIONS

Foale, T., "Some Technical Aspects of Tilting Trikes" Tony Foale Designs, Mar. 21, 1999, 25 pages.
(Continued)

*Primary Examiner* — James A English
(74) *Attorney, Agent, or Firm* — Alleman Hall Creasman & Tuttle LLP

(57) ABSTRACT

A tilting, preferably three-wheeled, vehicle is disclosed that has a tilting mechanism and a universal steering linkage that allows the vehicle to have leaning and steering characteristics substantially similar to those offered by an in-line two-wheeled vehicle, but that does not require complex linkages and/or control systems to operate effectively. A tilting linkage is operably secured to a frame to allow a pair of spaced apart wheels to remain substantially aligned with the plane of the vehicle throughout its range of movement while still providing an increasing camber between the wheels as tiling of the vehicle increases. A tilting lock system may be provide to limit tilting of the vehicle upon predetermined criteria.

13 Claims, 18 Drawing Sheets

Related U.S. Application Data continuation of application No. 13/235,344, filed on Sep. 16, 2011, now abandoned.

(60) Provisional application No. 62/239,905, filed on Oct. 10, 2015, provisional application No. 62/239,898, filed on Oct. 10, 2015, provisional application No. 62/239,900, filed on Oct. 10, 2015.

(56) References Cited

U.S. PATENT DOCUMENTS

| | | | |
|---|---|---|---|
| 3,572,456 A | | 3/1971 | Healy |
| 4,020,914 A | | 5/1977 | Trautwein |
| 4,065,144 A | | 12/1977 | Winchell |
| 4,072,325 A | * | 2/1978 | Bright ............... B62D 37/04 280/267 |
| 4,088,199 A | * | 5/1978 | Trautwein ............ B60G 21/007 180/209 |
| 4,159,128 A | | 6/1979 | Blaine |
| 4,375,293 A | | 3/1983 | Solbes |
| 4,487,429 A | | 12/1984 | Ruggles |
| 4,660,853 A | | 4/1987 | Jephcott |
| 4,685,690 A | | 8/1987 | Fujita et al. |
| 4,887,829 A | | 12/1989 | Prince |
| 5,326,121 A | * | 7/1994 | Fisher .................. B62K 5/00 280/124.103 |
| 5,611,555 A | | 3/1997 | Vidal |
| 5,762,351 A | * | 6/1998 | SooHoo ............... B60G 21/007 180/210 |
| D407,348 S | | 3/1999 | Riley |
| 6,203,043 B1 | | 3/2001 | Lehman |
| 6,326,121 B1 | * | 12/2001 | Takahashi ............ B41J 2/4753 347/192 |
| 6,367,824 B1 | | 4/2002 | Hayashi |
| 6,402,174 B1 | | 6/2002 | Maurer |
| 6,471,224 B1 | * | 10/2002 | Ziech .................. B60G 3/20 180/252 |
| 6,805,362 B1 | | 10/2004 | Melcher |
| 6,817,617 B2 | | 11/2004 | Hayashi |
| 7,044,252 B1 | | 5/2006 | Bertrand |
| 7,090,234 B2 | | 8/2006 | Takayanagi et al. |
| 7,287,611 B2 | | 10/2007 | Nagaya |
| 7,343,997 B1 | | 3/2008 | Matthies |
| 7,377,522 B2 | | 5/2008 | MacIsaac |
| 7,467,802 B2 | | 12/2008 | Peng et al. |
| 7,487,985 B1 | | 2/2009 | Mighell |
| 7,530,419 B2 | | 5/2009 | Brudeli |
| 7,571,787 B2 | | 8/2009 | Saiki |
| 7,591,337 B2 | | 9/2009 | Suhre et al. |
| 7,631,721 B2 | | 12/2009 | Hobbs |
| 7,644,938 B2 | | 1/2010 | Yamada |
| 7,665,742 B2 | | 2/2010 | Haerr et al. |
| 7,665,749 B2 | | 2/2010 | Wilcox |
| 7,850,180 B2 | | 12/2010 | Wilcox |
| 7,967,306 B2 | | 6/2011 | Mighell |
| 8,016,302 B1 | | 9/2011 | Reeve |
| 8,925,940 B2 | | 1/2015 | Mighell |
| 2003/0214113 A1 | | 11/2003 | Bank |
| 2004/0100059 A1 | | 5/2004 | Van Den Brink et al. |
| 2006/0042844 A1 | | 3/2006 | Kirkpatrick et al. |
| 2006/0255550 A1 | | 11/2006 | Pfeil et al. |
| 2007/0126199 A1 | | 6/2007 | Peng et al. |
| 2007/0151780 A1 | | 7/2007 | Tonoli et al. |
| 2007/0176384 A1 | * | 8/2007 | Brudeli ............... B62K 5/08 280/124.103 |
| 2007/0182120 A1 | | 8/2007 | Tonoli et al. |
| 2007/0193815 A1 | * | 8/2007 | Hobbs ................. B62K 5/10 180/348 |
| 2007/0262548 A1 | | 11/2007 | Rawlinson |
| 2007/0262549 A1 | | 11/2007 | Haerr et al. |
| 2008/0185807 A1 | | 8/2008 | Takenaka |
| 2008/0203693 A1 | | 8/2008 | Yamada |
| 2008/0258415 A1 | | 10/2008 | Melcher |
| 2009/0194961 A1 | | 8/2009 | Dieziger |
| 2011/0168473 A1 | | 7/2011 | Bedard et al. |
| 2016/0272264 A1 | * | 9/2016 | Mogensen ............ B62K 7/04 |

FOREIGN PATENT DOCUMENTS

| | | | | |
|---|---|---|---|---|
| WO | WO-2005002957 A1 | * | 1/2005 | ............ B62K 5/08 |
| WO | WO-2015067760 A1 | * | 5/2015 | ............ B62K 5/05 |

OTHER PUBLICATIONS

United States Patent and Trademark Office, Final Office Action Issued in U.S. Appl. No. 11/507,040, dated Nov. 7, 2008, 16 pages.
United States Patent and Trademark Office, Non-Final Office Action Issued in U.S. Appl. No. 11/507,040, dated Jun. 9, 2008, 19 pages.
United States Patent and Trademark Office, Non-Final Office Action Issued in U.S. Appl. No. 12/367,683, dated Jul. 13, 2010, 21 pages.
United States Patent and Trademark Office, Non-Final Office Action Issued in U.S. Appl. No. 13/169,719, dated Sep. 21, 2011, 18 pages.

* cited by examiner

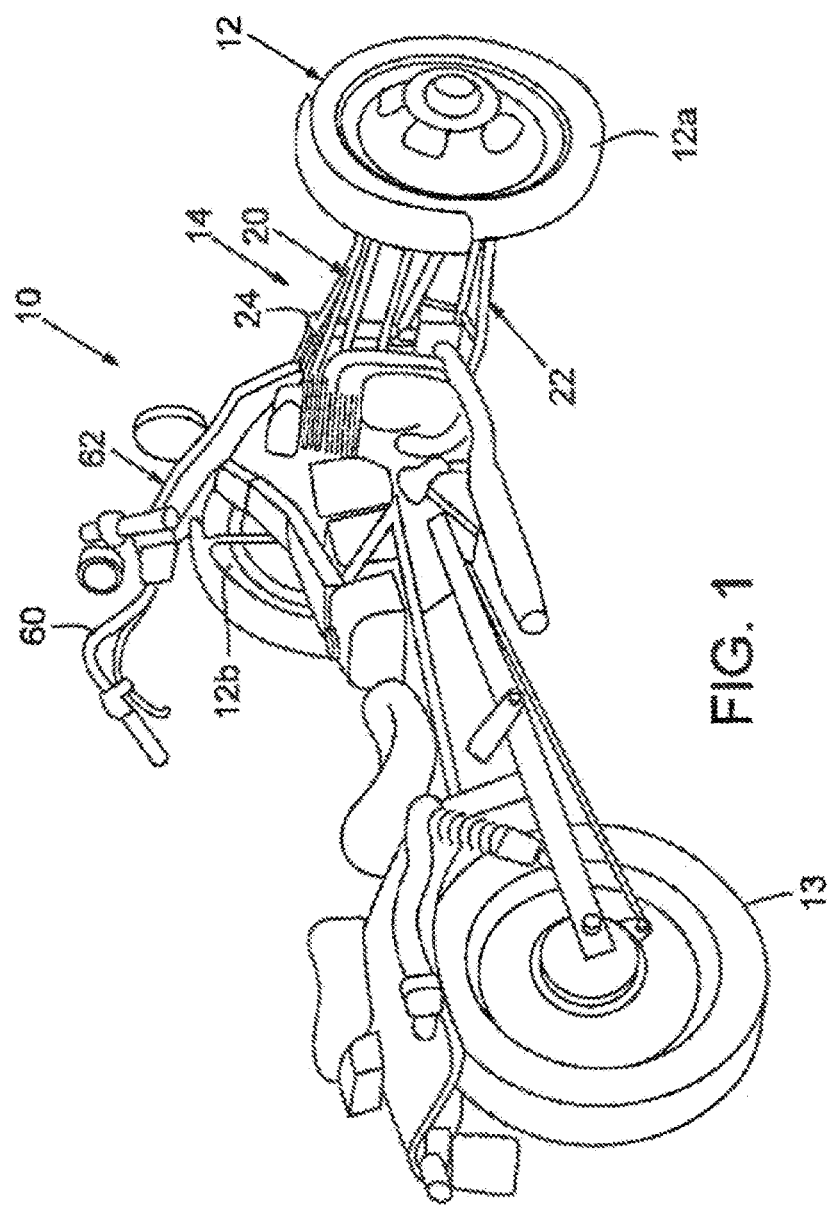

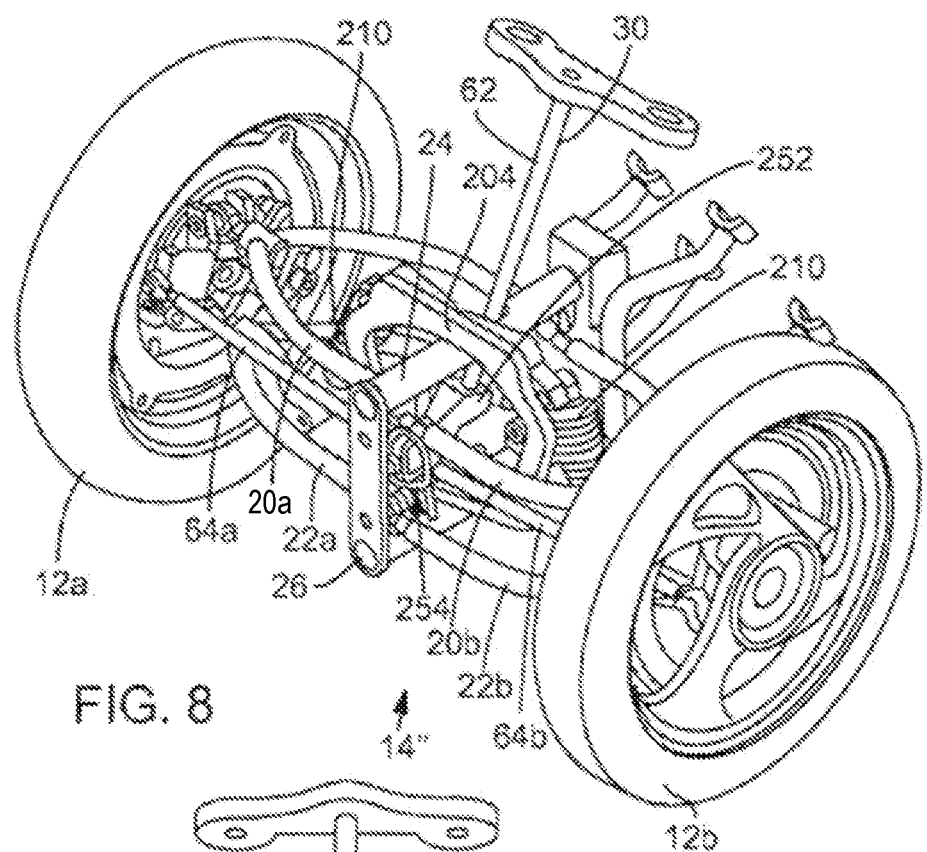
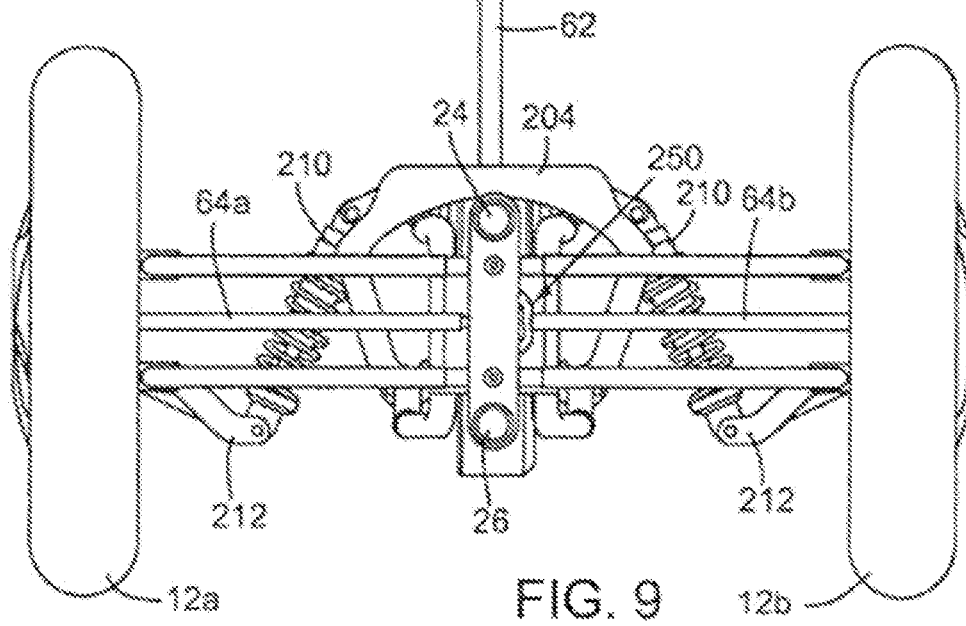

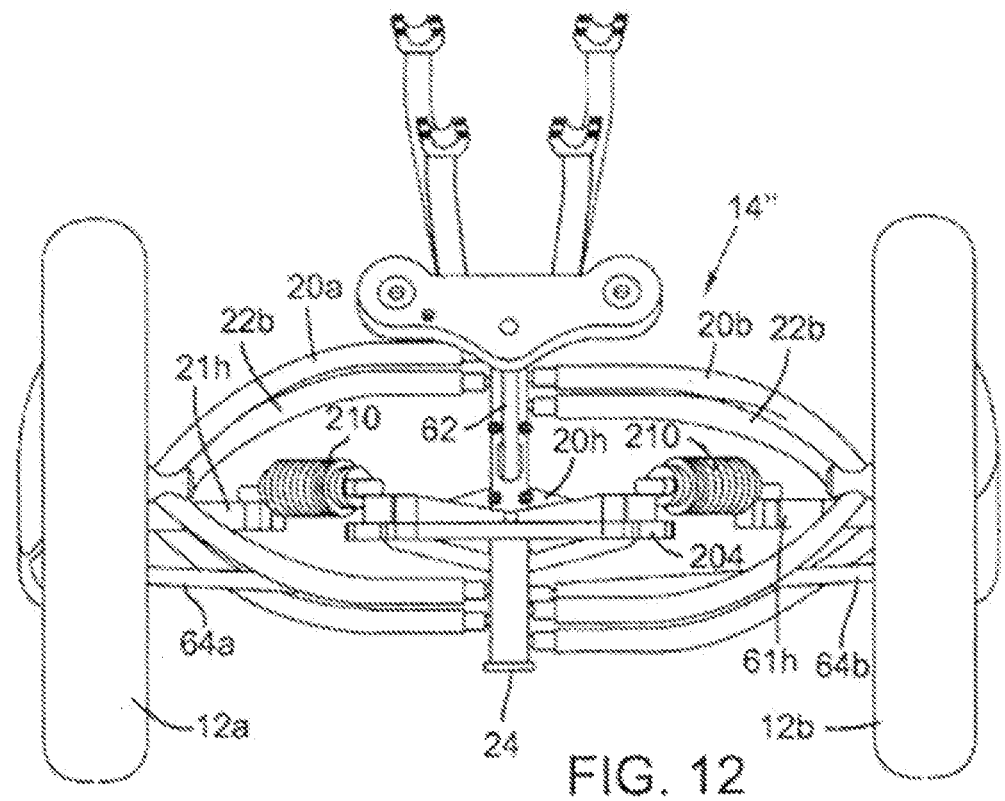
FIG. 12
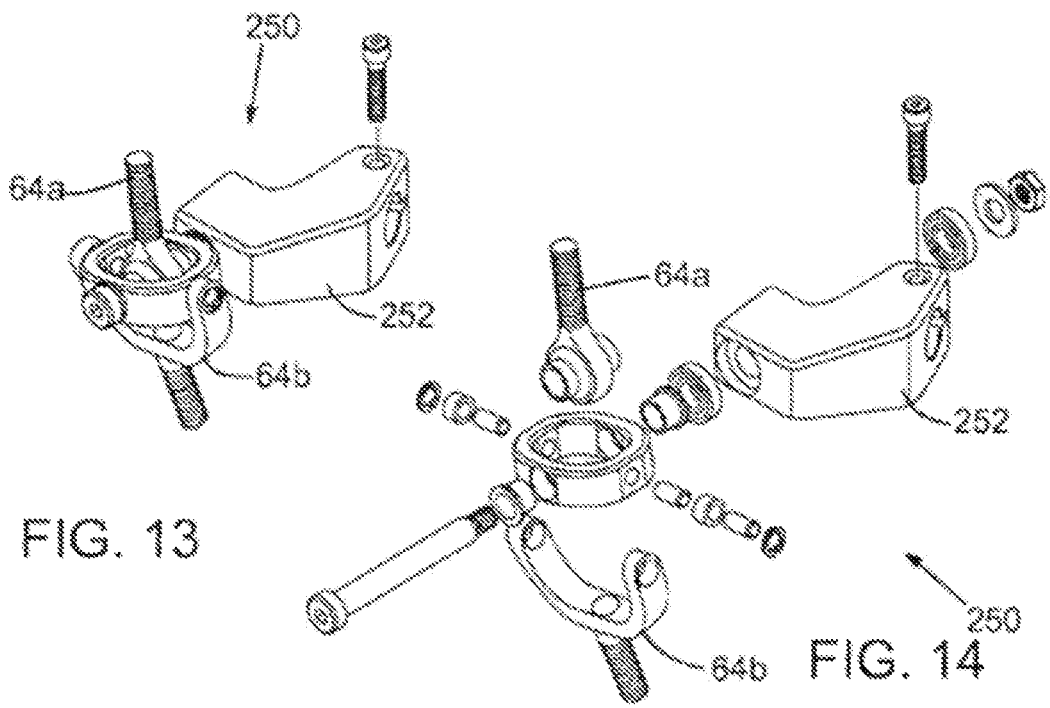
FIG. 13
FIG. 14

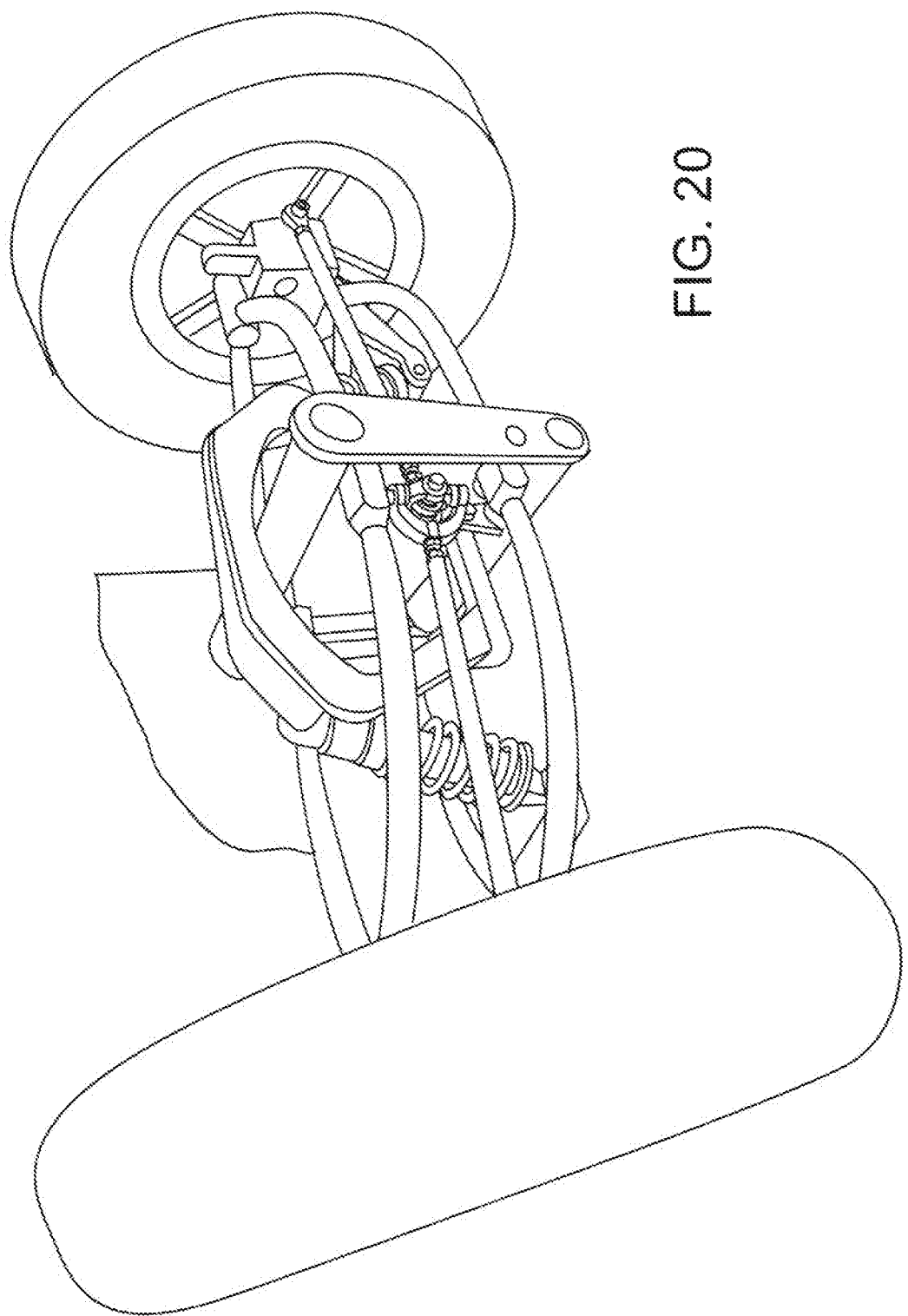

TILTING WHEELED VEHICLE

CROSS REFERENCE TO RELATED APPLICATIONS

This application is a continuation-in-part of U.S. application Ser. No. 14/589,734 filed Jan. 5, 2015, which is a continuation of U.S. application Ser. No. 13/460,282, filed Apr. 30, 2012; which is a continuation of U.S. application Ser. No. 13/235,344, filed Sep. 16, 2011, all of the disclosures of which are hereby incorporated by reference. This application also claims priority to U.S. provisional patent applications Nos. 62/239,898; 62/239,900; and 62/239,905, all filed on Oct. 10, 2015, and all the disclosures of which are hereby incorporated by reference.

FIELD OF THE INVENTION

This invention relates to wheeled vehicles such as motorcycles and the like. More particularly, this invention relates to a stable, preferable three-wheeled vehicle that offers maneuverability characteristics that are substantially similar to those of an in-line, two-wheeled vehicle.

BACKGROUND OF THE INVENTION

Unlike a typical three and four wheeled vehicles, in-line, two-wheeled vehicles, such as motorcycles, bicycles, and the like, allow a rider to lean or tilt while turning without urging the rider toward the outside of the turn. Instead, the rider of the in-line two-wheeled vehicle is pushed straight down into the seat as the free leaning motorcycle balances the vertical gravity vector with the horizontal vector created by going around a corner. The faster the rider goes around a corner, the more the In-line two-wheeled vehicle needs to lean.

But two-wheeled in-line vehicles are limited by only having one front tire as well as having the rider sitting high on the vehicle. The one front tire limits the amount of braking and amount of traction that can be achieved.

Efforts to apply tilting characteristics to three and four-wheeled vehicles have had limited success. Examples of such vehicles and their limitations are discussed In greater detail in an article titled "Some Technical Aspects of Tilting Trikes," by Tony Foale, B. Tech, M. Eng. Sc. dated Mar. 21, 1999, the disclosure of which is hereby incorporated by reference.

In general, these known tilting three-wheeled vehicles are limited by not allowing proper tilt of the vehicle, complex tilting structures that require excessive user interaction, and/or requiring complex control systems to operate effectively.

SUMMARY OF THE INVENTION

Despite the available three-wheeled vehicles, there remains a need for a three-wheeled vehicle that allows leaning and steering substantially similar to that offered by an In-line two-wheeled vehicle, but that does not require complex linkages and/or control systems to operate effectively. In addition to other benefits that will become apparent in the following disclosure, the present invention fulfills these needs.

BRIEF DESCRIPTION OF THE DRAWINGS

FIG. 1 is a rear right isometric view of a tilting three-wheeled vehicle in accordance with an embodiment of the present invention.

FIG. 8 is a partial top, right isometric view of the front end of a tilting three-wheeled vehicle in accordance with alternative embodiment of the present invention.

FIG. 9 is a front view of the tilting three-wheeled vehicle of FIG. 8.

FIG. 12 Is a top view of the tilting three-wheeled vehicle of FIG. 8.

FIG. 13 Is an enlarged, isometric view of a steering system universal joint installed on the tilting three-wheeled vehicle of FIG. 8 and in accordance with an embodiment of the present invention.

FIG. 14 is an exploded, isometric view of the steering system universal joint of FIG. 13.

FIG. 20 is an enlarged partial isometric view of the alternative embodiment steering system incorporating the universal joint if FIG. 19.

DETAILED DESCRIPTION OF PREFERRED EMBODIMENT

Figure 3:
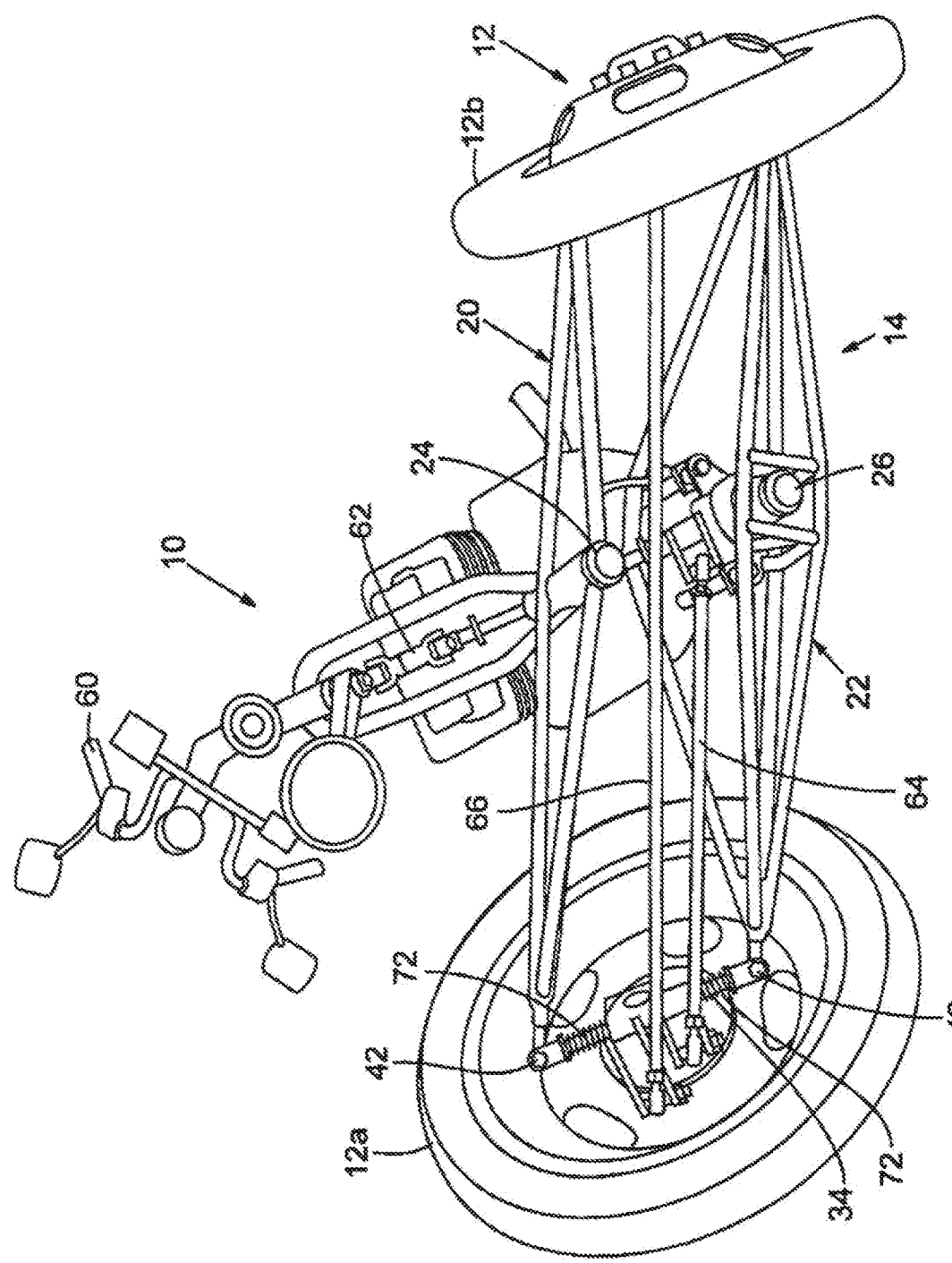
FIG. 3 is a front, plan view of the tilting three-wheeled vehicle of FIG. 1 showing a possible leaning position of the vehicle and the front wheels turned to define a possible right turn.
Figure 4:
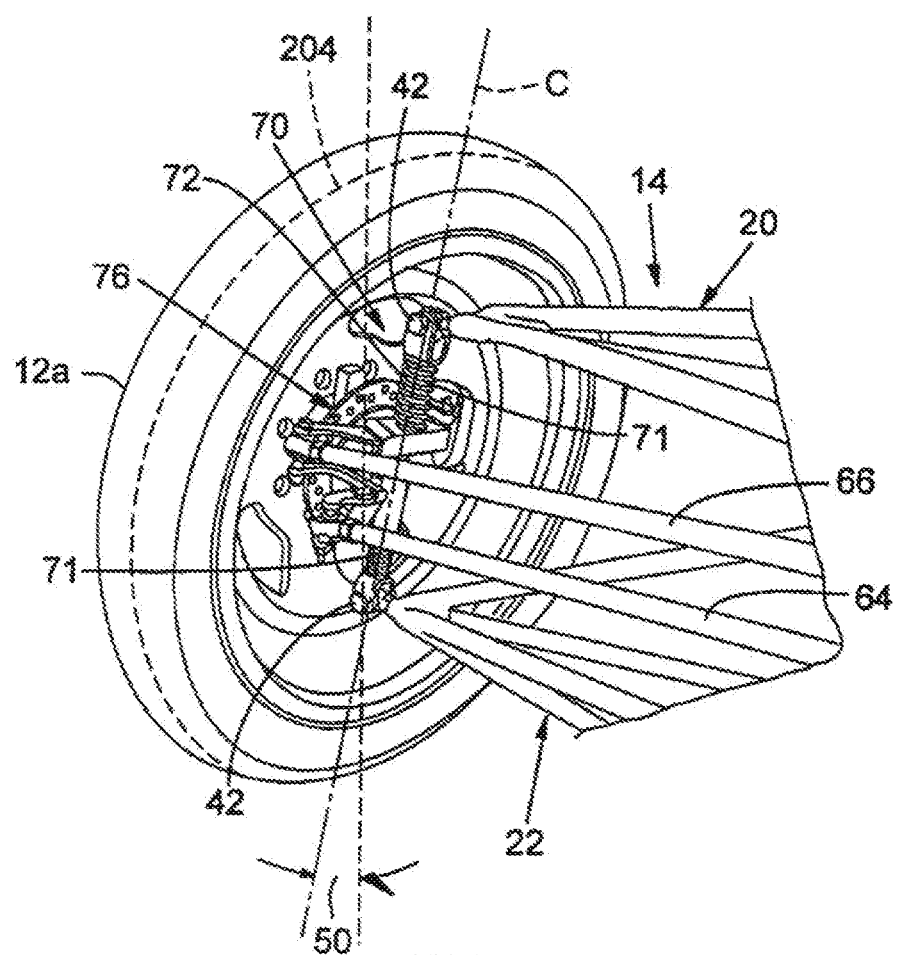
FIG. 4 is a partial, enlarged, isometric view of the right wheel assembly of the tilting three-wheeled vehicle of FIG. 1.
Figure 5:
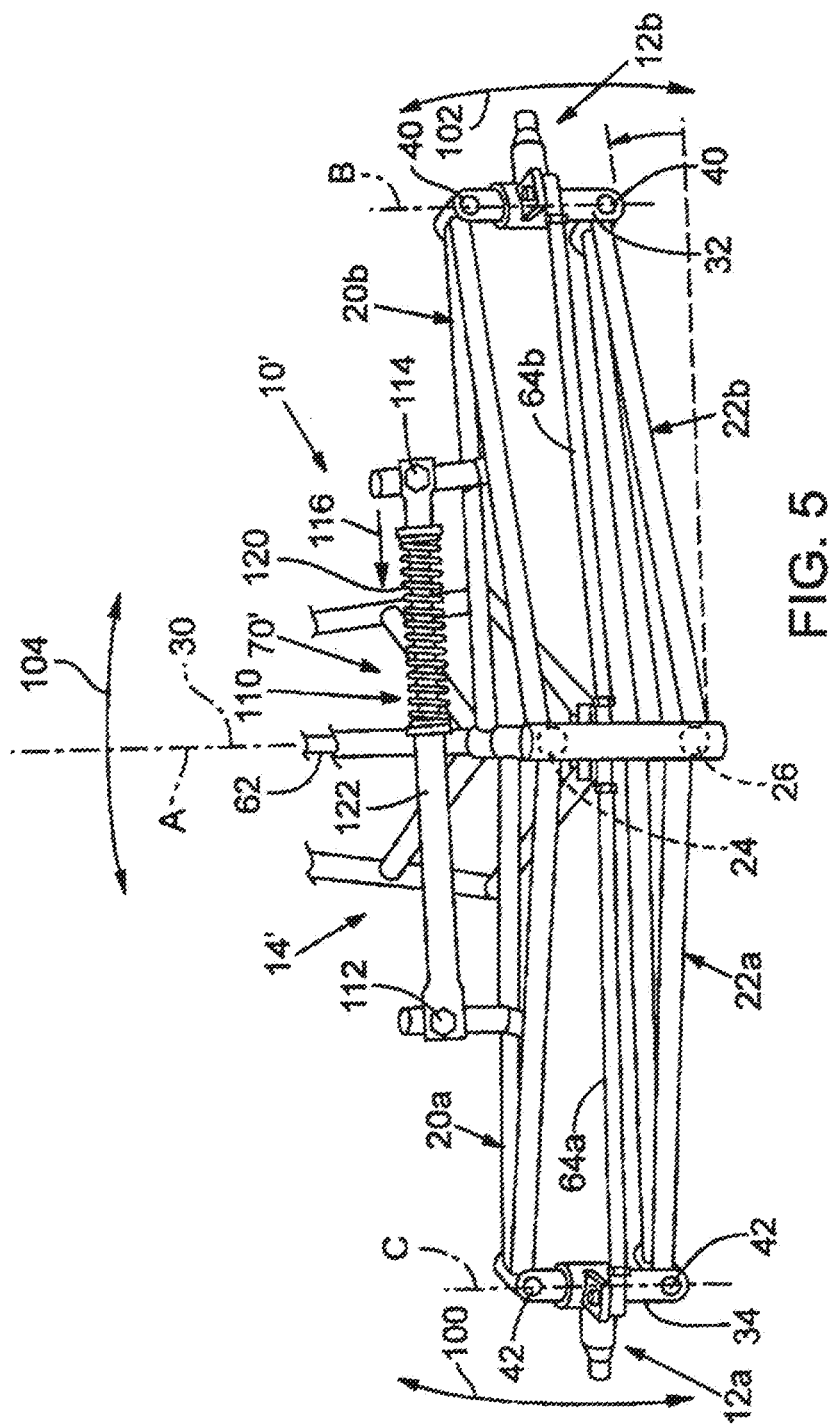
FIG. 5 is a front, isometric view of an alternative linkage for use on a tilting three-wheeled vehicle in accordance with an embodiment of the present invention.
Figure 6:
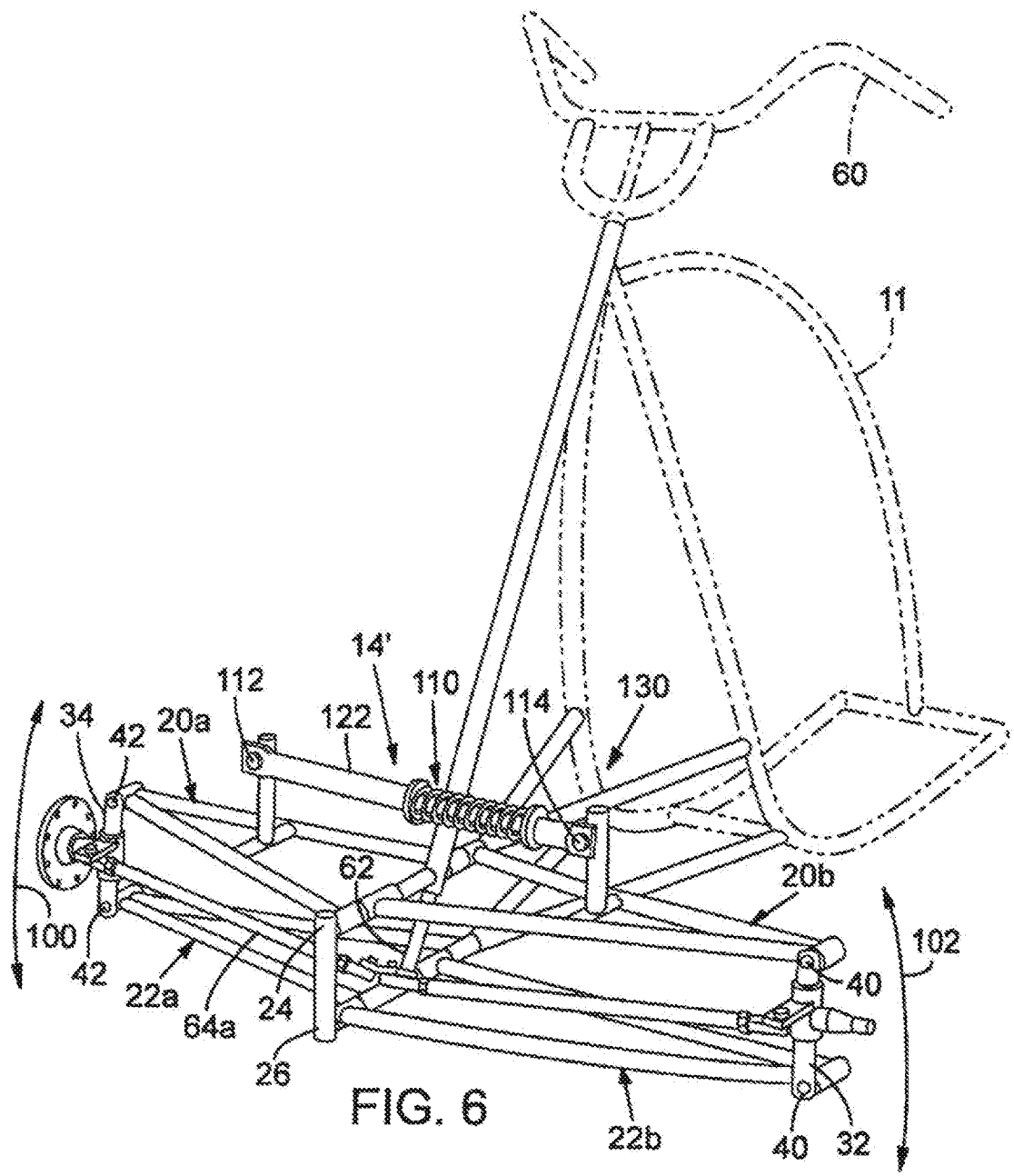
FIG. 6 is a left, isometric view of the alternative linkage of FIG. 5 showing a possible orientation on a motorcycle chassis shown in broken lines.
Figure 7:
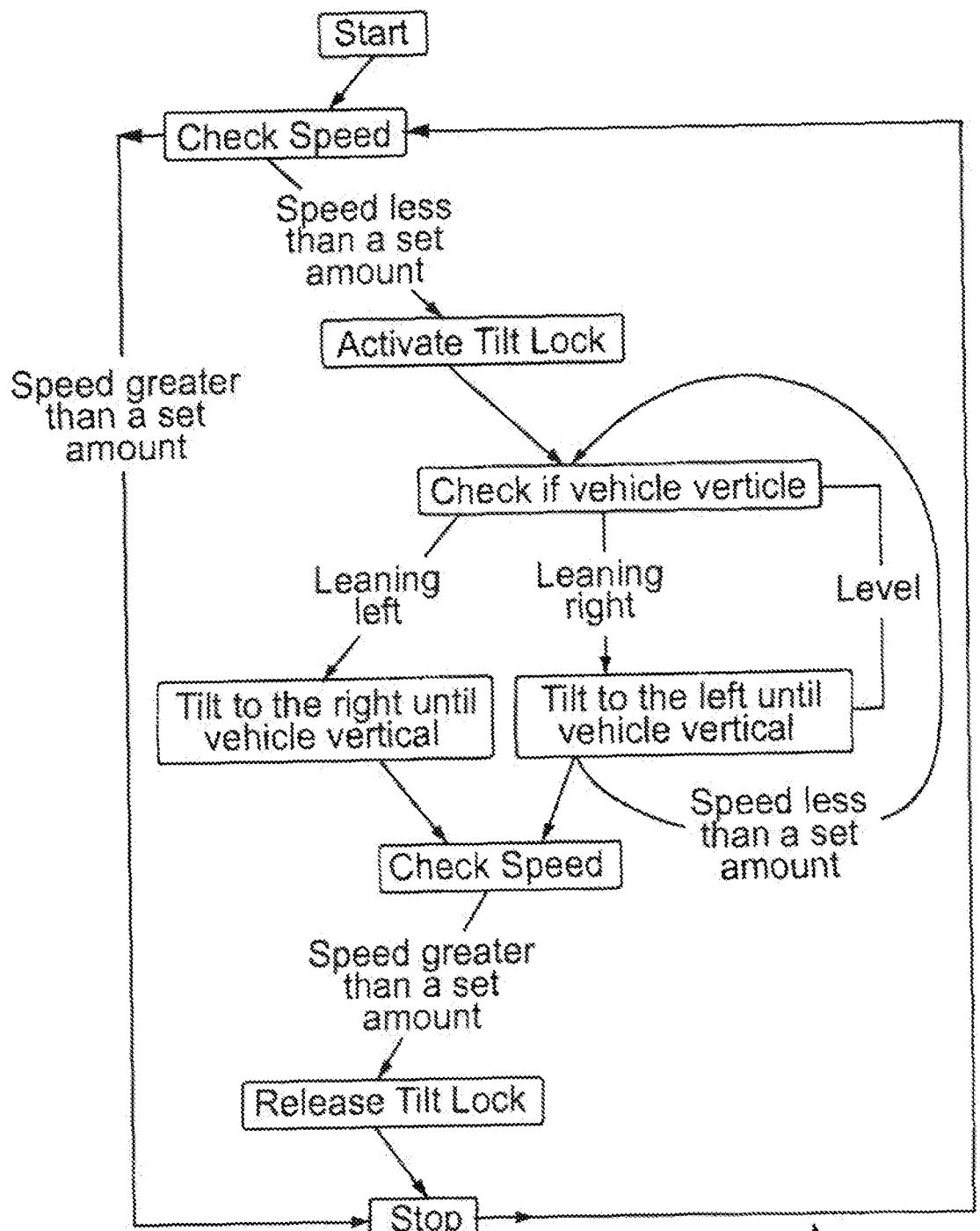
FIG. 7 is a schematic diagram of a possible tilt-locking control logic in accordance with an embodiment of the present Invention.
Figure 10:
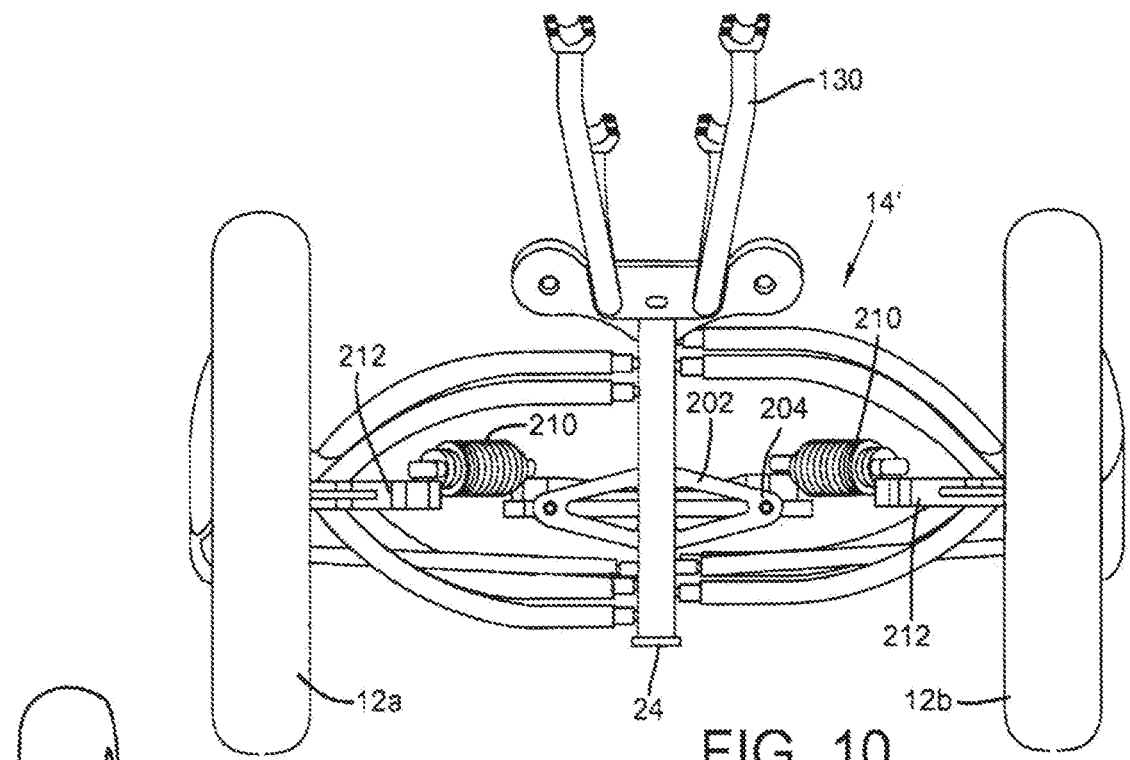
FIG. 10 is a bottom view of the tilting three-wheeled vehicle of FIG. 8
Figure 11:
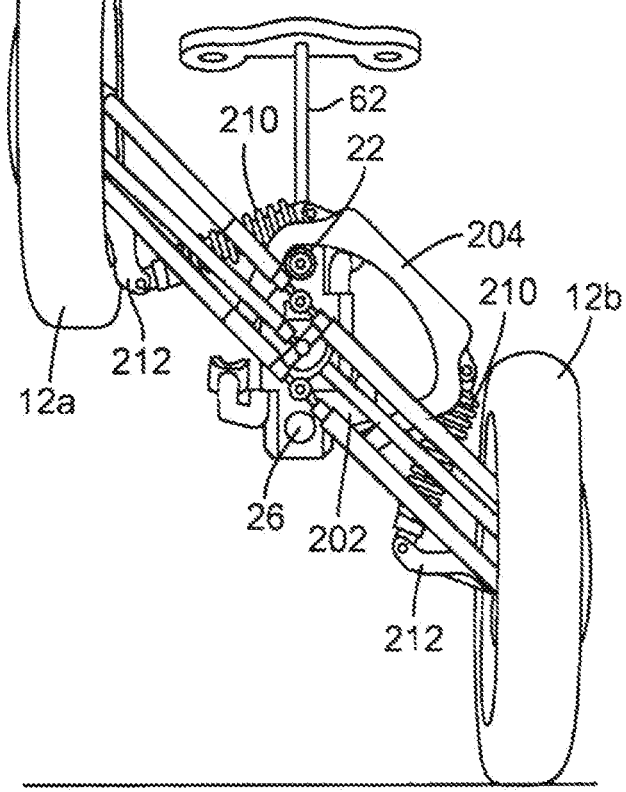
FIG. 11 is a partial front view of the tilting three-wheeled vehicle of FIG. 8 showing a possible tilted position of the vehicle.

A tilting three-wheeled vehicle 10 with an improved pivoting pair of spaced-apart steering wheels 12a, 12b operably secured thereto with a tilting linkage 14 extending between the steering wheels 12a, 12b and the vehicle 10 is disclosed in FIGS. 1-21C. A first preferred tilting linkage 14 is shown in FIGS. 1-4, and a second preferred tilting linkage 14' Is shown in FIGS. 5 & 6, and a third preferred linkage with optimized suspension is shown in FIG. 8-18. In addition, a preferred tilting lock mechanism (FIG. 18) and related control logic (FIGS. 7 & 21A-C) is disclosed, and a steering yoke that allows the wheels to be steered throughout the complete tilting range of motion of the vehicle is disclosed In FIGS. 13-15 & 19-20. The disclosure embodiments also allows the caber between the left and right wheels of the tilting vehicle to proportionally increase as the vehicle leans, thereby optimizing stability, control, and the feel of the vehicle. Each of these embodiments and features is discussed in greater detail below and/or in the materials incorporated by reference.

Referring to FIGS. 1-4, the vehicle 10 replaces the front wheel of a two-wheeled in-line vehicle with a the pair of substantially parallel-aligned wheels 12a, 12b joined to the vehicle 10 by a linkage 14 that tilts each wheel 12a, 12b substantially similar to the tilt of the vehicle 10 during use.

Figure 2A:
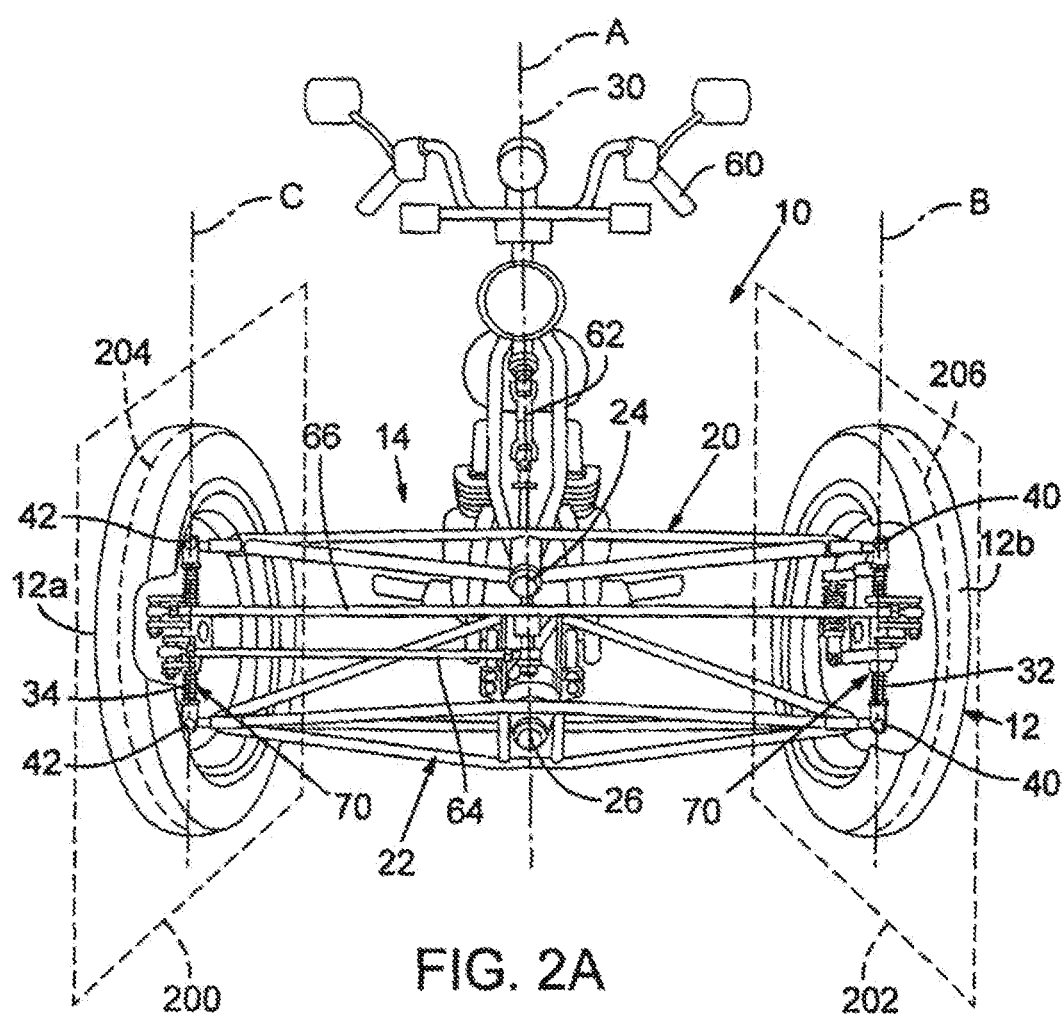
FIG. 2A Is a front, plan view of the tilting three-wheeled vehicle of FIG. 1 showing a possible straight position of the vehicle and the front wheels aligned to urge the vehicle In a straight direction.

In one disclosed embodiment best shown in FIG. 2A, the linkage 14 has an upper and lower spaced-apart and substantially elongate cross members 20, 22, respectively, that are each pivotally secured to the front of the vehicle at respective pivots 24, 26. The upper and lower spaced apart cross-members 20, 22, are substantially parallelly aligned, with the pivots 24, 26 for each cross-member being substantially aligned on the steering axis 30 of the vehicle 10.

Auxiliary steering shafts 32, 34, which are also referred to as •"kingpins" herein, are operably secured to the distal ends of each respective cross member defining a left steering shaft 32 extending between the left distal ends 40 of the upper and lower cross-members 20, 22 and a right steering shaft 34 extending between the right distal ends 42 of the upper and lower cross-members 20, 22. The left and right steering shafts 32, 34 are substantially parallelly aligned with each other and the steering axis 30 of the vehicle and have substantially the same caster angle 50 (FIG. 4).

In one embodiment, the king pins preferably do not go through the center of their respective wheel axis but rather are set back toward the rear of the vehicle approximately 2.5 inches to allow the contact patch of the tire to be slightly behind an imaginary line that goes down the center of the king pin. Alternatively, no offset need be provided so long as each wheel's caster angle 50 (FIG. 4) Is adjusted accordingly.

Each wheel 12a, 12b of the pair of wheels 12 Is operably secured to one of the steering shafts 32, 34. The left wheel 12b is operably secured to the left sheering shaft 32 and the right wheel 12a is operably secured to the right steering shaft 34 so as to allow each wheel 12a, 12b to turn about its respective steering axis B, C. Accordingly, the steering axes B & C of the left and right wheel 12a, 12b are substantially parallelly aligned with the steering axis 30 of the vehicle 20 and each wheel 12a, 12b is able to turn about its respective steering shaft 32, 34. More preferably, each steering shaft 32, 34 is aligned so that its respective steering axis B, C is coincident with a substantially vertical plane 200, 202 intersecting the longitudinal center 204, 206 of the respective wheel as best shown in FIG. 2A.

Preferably, the handlebars 60 of the vehicle 10 operably engage a primary steering shaft 62 (FIG. 3), which defines the steering axis 30 of the vehicle. A first tie rod 64 extends from a lower portion of the steering shaft 62 to the right wheel 12a, and a second tie rod 66 extends from the right wheel 12a to the left wheel 12b as shown. Accordingly, when a rider turns the handlebars 60, the steering shaft 62 rotates in the commanded direction thereby urging the first tie rod 64 to turn the right wheel 12a about the right steering shaft 34. The second tie rod 66 simultaneously urges the left wheel 12b to pivot in the same commanded direction about the left steering shaft 32. Accordingly, it can be appreciated that the vehicle may be steered in substantially the same manner as a conventional in-line two-wheeled vehicle.

Preferably and referring to FIGS. 2A & 4, a suspension system 70, such as a spring 72 and/or dampener 71, operably engage each wheel 12a, 12b as shown. An alternative preferred linkage system with suspension system 70' is shown in FIGS. 14-30. An upper pivot frame 24 and lower pivot frame 26 are aligned along the steering axis 30 of the vehicle. Cross members 20a, 20b, 22a, 22b, extend from the upper and lower pivot frames to their respective wheels 12a, 12b as shown. A lower suspension frame is pivotally secured to the lower pivot frame and a C-shaped suspension support straddles the upper pivot frame and is pivotally secured to the lower suspension support.

Suspension elements, such as a spring and/or dampener extend from the C-shaped suspension support to suspension mounts at each wheel 12 a, 12 b. Accordingly, the suspension elements remain in their neutral positions throughout the tilting and turning range of motion of the vehicle as best shown In FIGS. 2B, 3, 11, and 16.

Figure 15:
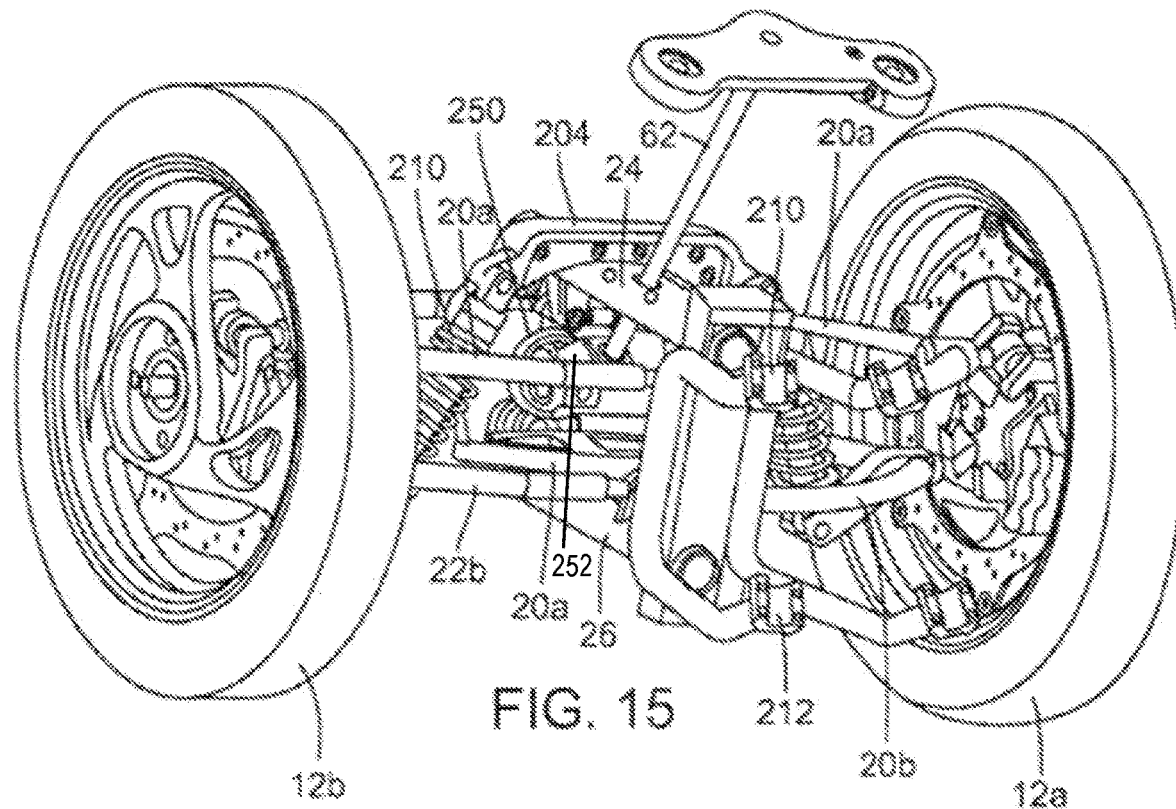
FIG. 15 is a rear, right isometric view of the three-wheeled vehicle of FIG. 8.

More preferably, the steering system components are configured so as to provide conventional Ackermann steering. Referring to FIGS. 13-15 a universal joint steering yoke 250 operably connecting a steering shaft 62 (FIG. 15) to the wheels (12 a, 12 b) with tie rods (64 a, 64 b). For example, the steering shaft 62 can be connected to the universal joint steering yoke 250 at 252 shown in FIGS. 13-15. This joint allows each front wheel to be steered by the handlebar without compromising steering feel or force on the rider throughout the entire tilting range of motion of the vehicle.

Figure 19:
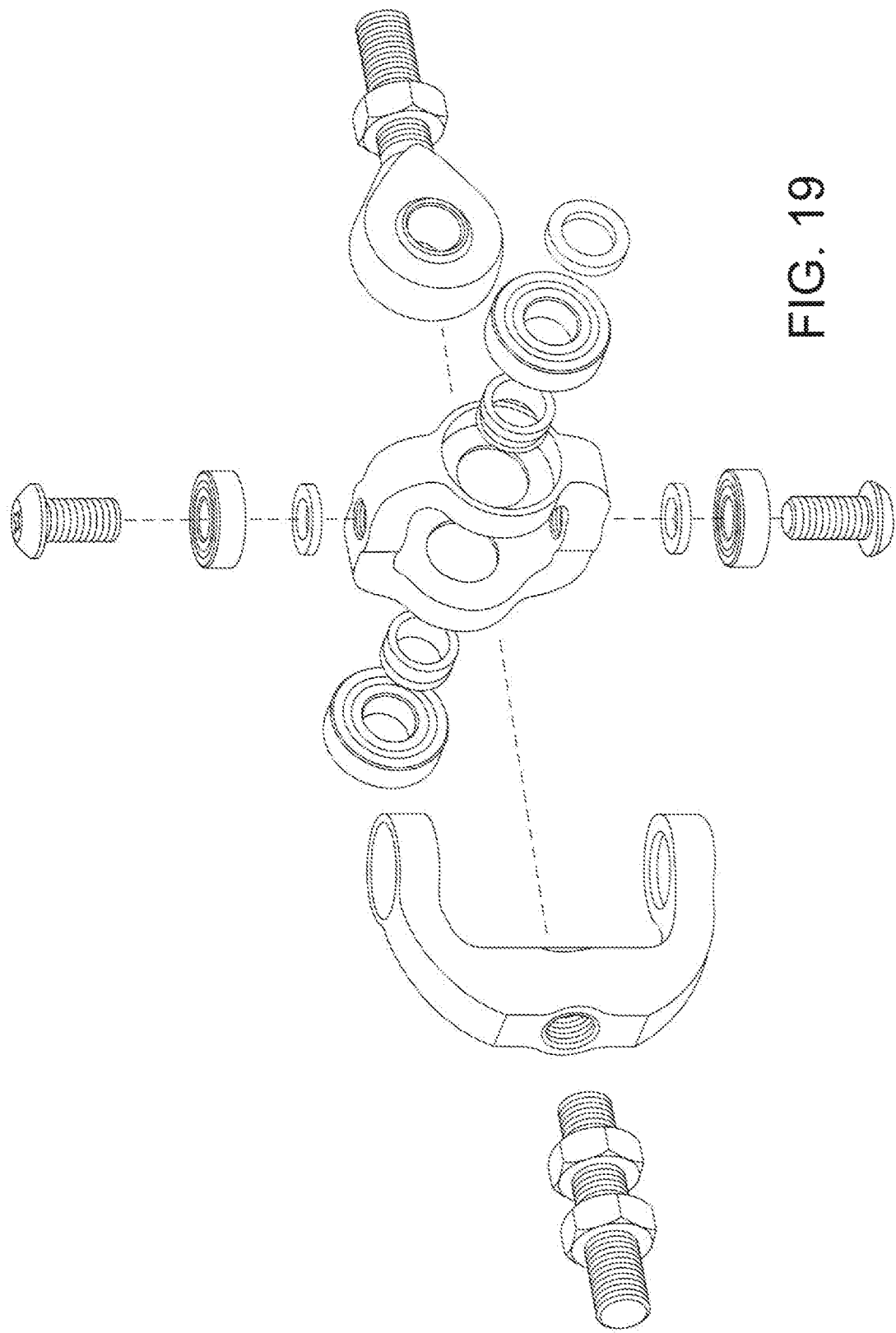
FIG. 19 is an exploded for of an alternative possible universal joint in accordance with an embodiment of the invention.

Alternatively, a universal joint as shown in FIGS. 19 & 20 may be used. A discussion of its assembly, use and operation is provided in Attachment A to U.S. provisional patent application No. 62/239,898, filed Oct. 10, 2015, the disclosure of which is hereby incorporated by reference. The following coordinate system facilitates this discussion. Axis X is defined down the centerline of threaded rod as well as down the centerline of Aurora AM-8T Rod End. Axis Y is defined down the centerline of bearing through pinch washer, and Axis Z is defined down the centerline of button head bolt and 0.875 bearing.

The threaded rod is attached to the proximal end the right steering tie rod. Right being defined as the rider's right when seated on the bike. The distal end of the right steering rod is connected to the right wheel hub assembly. The Aurora AM-8T Rod End is attached to the proximal end of the left steering tie rod. The distal end of the left steering tie rod is connected to the left wheel hub assembly. A bolt is goes through bearing and connects the whole steering joint to a steering knuckle.

The steering joint allows both the left and right tie rods to independently pivot about both the Z & Y axes. The tie rods pivot about the Y-axis to allow for suspension travel. The tie rods pivot about the Z-axis to allow for steering. At the same time, the whole joint is able to pivot about the Y axis to allow for the vehicle to lean while not affecting either the steering or the suspension travel.

With the tie rods positioned as shown in the FIG. 20, when the steering is turned to the left, the left tie rod travels a shorter distance than the right tie rod because is traveling through a shorter arc. This causes the left wheel to turn less than the right wheel. This is the opposite steering effect desired when you are trying to achieve the proper Ackermann's steering which wants the inside wheel (left in this case) to turn more than the outside wheel (right in this case). Our knuckle keeps those distances the same and allows you to achieve proper Ackermann's geometry by the positioning of the distal tie rod end on the spindle housing.

With the tie rods positioned as shown in the FIG. 20, when the steering is turned to the left, the left tie rod travels a shorter distance than the right tie rod because is traveling through a shorter arc. This causes the left wheel to turn less than the right wheel. This is the opposite steering effect desired when you are trying to achieve the proper Ackermann's steering which wants the inside wheel (left in this case) to turn more than the outside wheel (right in this case). Our knuckle keeps those distances the same and allows you to achieve proper Ackermann's geometry by the positioning of the distal tie rod end on the spindle housing.

The steering joint also allows for almost zero bump steer with our tilting front end geometry since the tie rod is pivoting about the same central axis as the upper and lower a-arms.

This steering knuckle may also be used in a slightly different configuration as a joint similar to a U-joint but allow for a higher angle of power transfer. The power in could be one side of the Axis X (like the threaded rod in our example) and the power out would be the opposite side of Axis X (like the Aurora AM-8T Rod End (7) in our example). The axes Y and Z would be unconstrained.

Figure 2B:
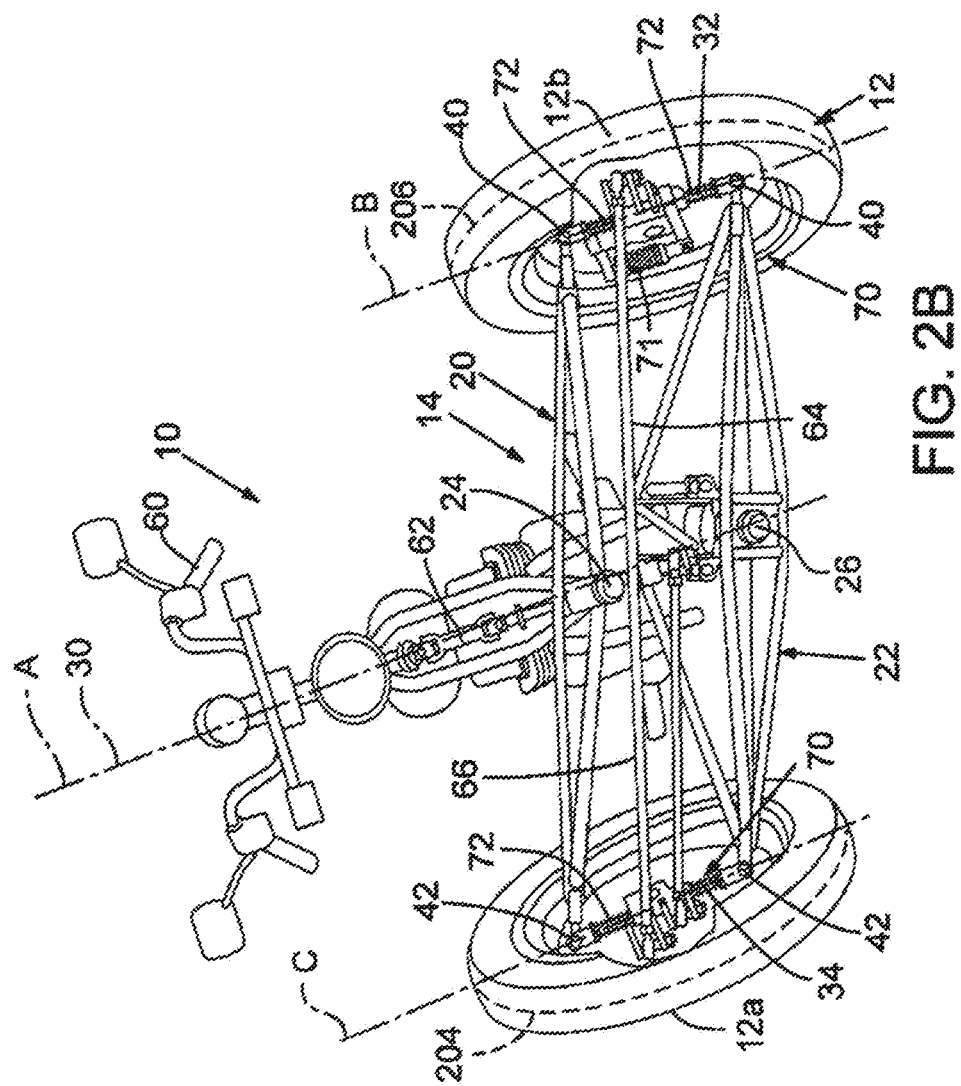
FIG. 2B is a front, plan view of the tilting three-wheeled vehicle of FIG. 1 showing a possible leaning position of the vehicle with the front wheels aligned to urge the vehicle in a straight direction.

The present invention allows a three-wheeled vehicle to lean substantially similarly to an in-line two-wheeled vehicle. Referring to FIGS. 2A, 2B and 3, when the steering axis 30 of the vehicle is aligned substantially vertically as shown in FIG. 2A, both the left wheel 12 *b* and right wheel 12*a* are aligned substantially vertically. As shown in FIG. 2A, the vehicle 10 includes an elongate frame defining a frame plane A extending substantially vertically along a longitudinal centerline of the frame. However, during turning operations, such as a right turn shown in FIG. 3, when the vehicle naturally leans into the turn, the left and right wheels also lean by substantially the same amount. Referring to FIG. 2B, a lean to the right will also cause the left and right wheels to lean right by substantially the same amount. FIG. 2B shows the frame plane A for a leaning position of the vehicle.

Referring to FIGS. 5& 6, an alternative preferred tilting linkage 14' is disclosed. In order to reduce undue repetition, like elements between this embodiment and the previously disclosed tilting linkage 14 are like numbered.

The alternative preferred linkage 14' of FIGS. 5 & 6 preferably has a pair of upper cross members 20*a*, 20*b* and a vertically spaced apart pair of lower cross members 22*a*, 22*b* respectively. Each cross member 20*a*, 20*b*, 22*a*, 22*c* is pivotally secured to the front of the vehicle at respective, substantially horizontal, pivot shafts 24', 26'. Namely, cross members 20*a*, 20*b* are pivotally secured to pivot shaft 24' and lower cross members 22*a*, 22*b* are pivotally secured to pivot shaft 26'. The pivot shafts 24', 26' are positioned substantially vertically with respect to each other along the steering axis 30 and spaced apart from each other as best shown in FIG. 5. Accordingly, the distal ends of upper cross member 20*a* and lower cross member 22*a* move substantially In the directions of arrow 100 and the distal ends of upper cross member 20*b* and lower cross member 22*b* move substantially in the directions of arrows 102 as the steering shaft tilts about arrow 104.

Auxiliary steering shafts 32, 34, which are also referred to as "kingpins" herein, are operably secured to the distal ends of each respective cross member defining a left steering shaft 32 extending between the left distal ends 40 of the upper and lower cross-members 20*b*. 22*b* and a right steering shaft 34 extending between the distal ends 40 of the upper and lower cross-members 20*a*, 22*a*. The left and right steering shafts 32, 34 are substantially parallelly aligned with each other.

If desired, the caster angle 50 (FIG. 4) of the left and right steering shafts 32, 34 can differ from the caster angle of the steering axis 30. More preferably, the castor angle 50 of the left and right steering shafts 32, 34 Is selected so that there is about a 2.5 inch to 3.5 inch trail, defined as the distant between the contact patch of the respective wheel 12*a*, 12*b* with the ground and the contact point with the ground of an imaginary line extending from the respective steering shaft 32, 34. More preferably, the trail for each wheel 12*a*, 12*b* is about 3 inches. It can be appreciated that since the steering axis 30 Is separate from the kingpins, any steering axis angle may be used to optimize driver handlebar positioning while still allowing for the optimizing each wheel's caster angle.

Each wheel 12*a*, 12*b* of the pair of wheels 12 is operably secured to one of the steering shafts 32, 34. The left wheel 12*b* is operably secured to the left sheering shaft 32 and the right wheel 12*a* is operably secured to the right steering shaft 34 so as to allow each wheel 12*a*, 12*b* to turn about Its respective steering axis B, C. Accordingly, the planes of the left and right wheel 12*a*, 12*b* are substantially parallelly aligned with the steering axis 30 of the vehicle 20 and each wheel 12*a*, 12*b* is able to turn about its respective steering shaft 32, 34.

Preferably, the handlebars 60 of the vehicle 10 operably engage a primary steering shaft 62 (FIG. 5), which defines the steering axis 30 of the vehicle. FIG. 5 shows the frame plane A of the vehicle. A first tie rod 64 *a* extends from a lower portion of the steering shaft 62 to operably engage the right wheel 12 *a*, and a second tie rod 64 *b* extends from the lower portion of the steering shaft 62 to operably engage the left wheel 12 *b* as shown. Accordingly, when a rider turns the handlebars 60, the steering shaft 62 rotates in the commanded direction thereby urging the first tie rods 64 *a*, 64 *b* to turn their respective wheels in the commanded direction. Accordingly, it can be appreciated that the vehicle may be steered in substantially the same manner as a conventional in-line two-wheeled vehicle.

Preferably and referring to FIGS. 5 & 6, a suspension system 70', such as a spring 120 and/or dampener 122, operably engages the linkage 14'. More preferably, the spring 120 and dampener 123 are pivotally secured to both the left and right portions of the linkage 14' at pivots 114, 112, respectively as shown. Accordingly, both the left and right portions of the linkage 14' are independently movable in the directions of arrows 102, 100, respectively, while also being urged to a neutral, substantially horizontal configuration with respect to each other.

More preferably, the tie bars 64, 66 are sized to as to allow the outer wheel in a given turn to turn slightly less in the commanded direction than the inner wheel of the turn.

Figure 16:
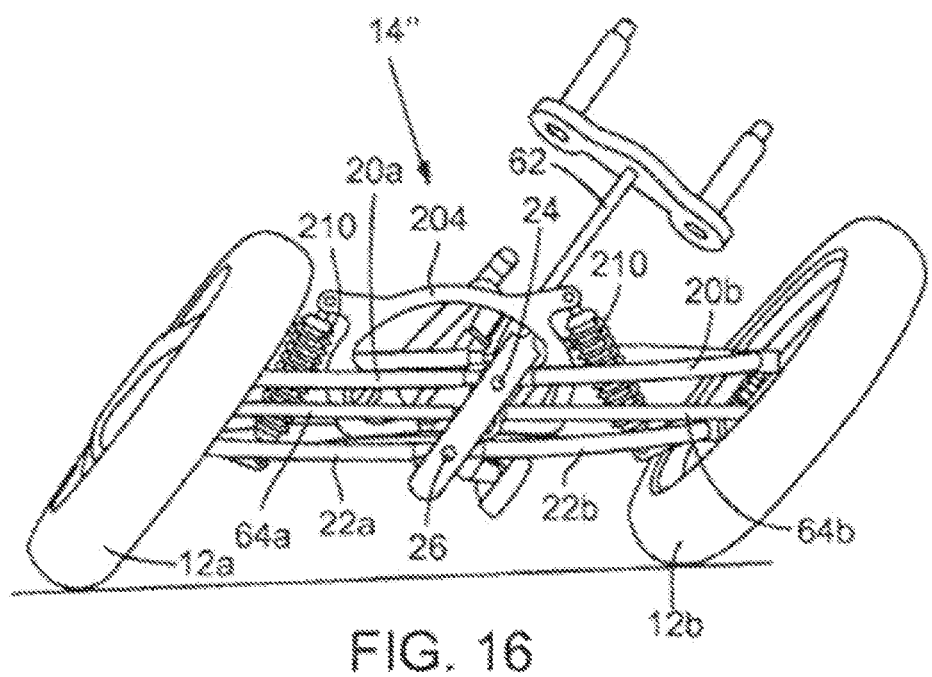
FIG. 16 is a front view of the three-wheeled vehicle of FIG. 8 showing a possible tilted position of the vehicle.
Figure 17:
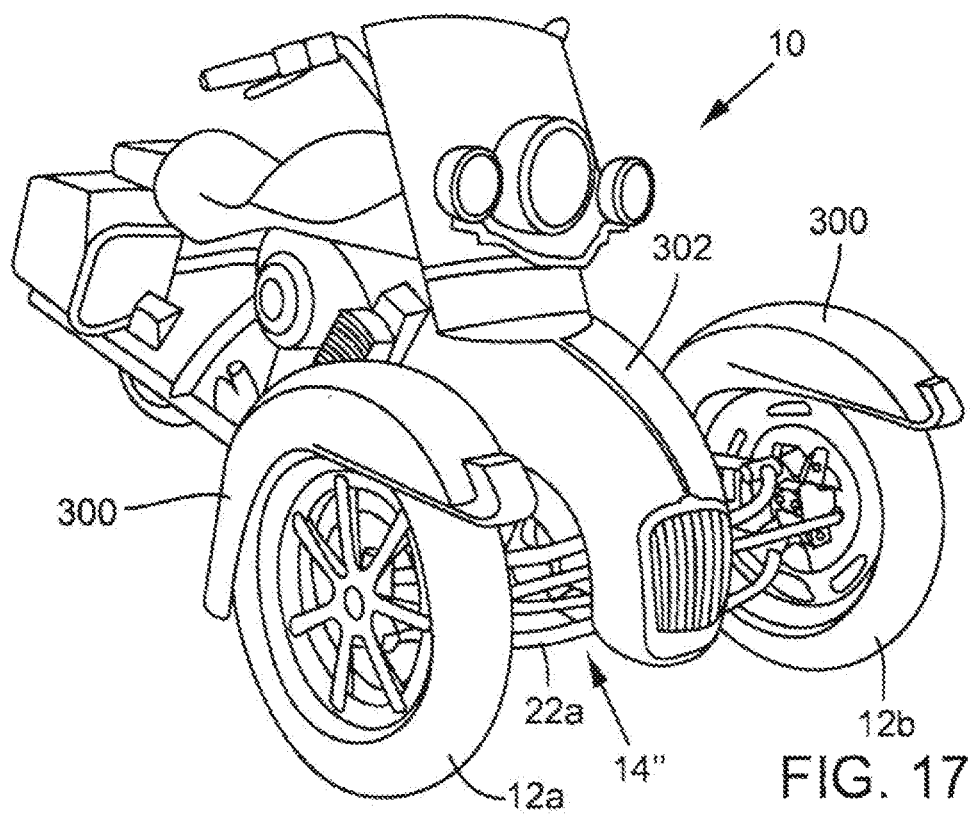
FIG. 17 is a front, right view of the three-wheeled vehicle of FIG. 8 showing a possible fender and front end cover arrangement.
Figure 18:
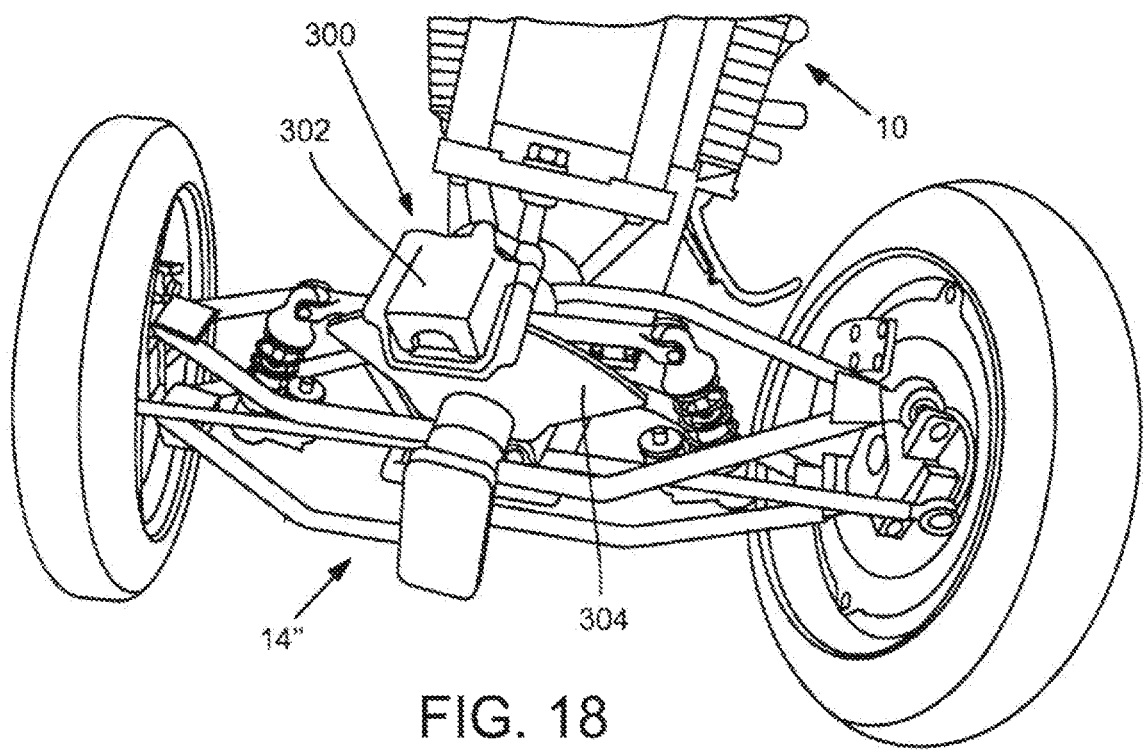
FIG. 18 is a front left isometric view of the three-wheeled vehicle of FIG. 8 showing a possible hydraulic disk tilt lock structure.

Referring to FIGS. 8-12 and 15 and 16, an alternative linkage structure providing constant dampening suspension force throughout the entire tilting range of motion of the vehicle is shown. A c-shaped member straddles the vehicle frame and operably connects left and right suspension elements 210 to the wheels 12 *a*, 12 *b* (e.g., at 212 shown in FIGS. 9-11, or at 21*h* and 61*h* shown in FIG. 12). This orientation allows the force on the suspension elements 210 to remain constant when the vehicle is tilted as shown in FIG. 16 or standing straight up as shown in FIG. 9, and with the wheels 12 a, 12 b turned as shown in FIG. 18 or pointing straight as shown in FIG. 9.

The disclosed embodiments allow positioning of a driver low in the vehicle 10 behind the engine. Preferably, placing the engine to the rear would create a vehicle too light In the front where most of the braking occurs and would can make the vehicle prone to oversteering issues which would lead to spin outs. Placing the motor in the front would most likely lead to an understeering vehicle, which would be a safer situation when driving at the vehicle's limits. Lowering of the vehicle's center of gravity Is universally seen as desirable and reduces the chance of the vehicle flipping over which is very difficult to do on a motorcycle or like vehicle unless the wheels encounter some non-movable object such as a curb or rock. This characteristic is known by motorcyclists as "highsiding" and tends to sling the rider up over the top of their bike. Lowering the vehicle's center of gravity will allow the vehicle to shift from a left to right turn faster than a similar vehicle with a higher center of gravity.

This three-wheeled vehicle 10 of the present invention allows it to steer and maneuver like a conventional in-line two-wheeled vehicle but have better braking and traction capabilities. With the driver sitting low in the vehicle like In a sports car, he would not have the uncomfortable feeling of being tossed left or right when cornering hard.

There are two ways to achieve a leaning vehicle. One way is to have the vehicle "free lean" such as a motorcycle where the steering input is the only force needed to create the lean. A free leaning vehicle needs to be able to lean at up to a 45-50 degree angle to allow for a maximum lean required during a fast tight turn. If the free leaning vehicle is mechanically challenged in that it cannot achieve such a lean without part of the chassis hitting the pavement or some binding occurring in the leaning mechanism, then the forces are not adequately balanced and the driver begins to feel the force of being toss to the outside. This also causes the force on the tires to no longer be straight down and can cause the vehicle to slide as motorcycles do not have much of a contact patch on the pavement and are not designed to handle side load forces.

The other way to achieve a leaning vehicle relies on complex control systems such as computer input from steering sensors to command hydraulic actuators as needed to force the vehicle to lean.

The present invention relies on a free leaning design. It has been designed to have no clearance Issues up to 45 degrees so it should be able to lean up to all angles required by the driver regardless of speed or sharpness of turn. It will steer like a motorcycle and require use of counter steering to control. This method of steering is familiar to all motorcyclists who are able to switch back and forth between steering a car and a motorcycle with no confusion. Anyone truly wanting to learn to drive a motorcycle is not put off by the fact that it steers differently than a car. In fact, many motorcyclists do not even realize that they are using counter steering to control their bike and just do it intuitively. People who have not driven motorcycles before may find the vehicle difficult to control until they learn how to steer it properly.

The preferred embodiment of the present invention is also far less expensive and complicated to manufacture than any forced leaning vehicle.

With Increased upfront traction and braking capabilities of a motorcycle combined with a lower center of gravity than a motorcycle offered by at least one embodiment of the present Invention, the vehicle of the present invention will outperform motorcycles with the same size engine despite being slightly heavier due to the additional steering linkage and additional wheel.

Known tilting vehicles mislocate the kingpins which are offset toward the center of the vehicle similar to how an automobile's steering is built. By centering the kingpin left to right inside the wheel of a motorcycle type tire and rim and bringing the kingpin inclination angle (or known as Steering Inclination angle (SIA) or Steering Axis Inclination (SAI)) to 0 degrees, the present invention achieves a substantially 0 scrub radius when the vehicle is tracking In a straight line which is substantially similar to how a motorcycle's steering works. The scrub radius will then shift from positive to negative as the vehicle leans with one side being positive and the other being negative at the same lean angle.

The castor of the kingpins can also mimic that of a motorcycle and be in the range of 24-30 degrees. Sport motorcycles have a smaller castor angle while "choppers" have a lot more. The first disclosed embodiment has a middle of the range 27 degrees. The second disclosed embodiment has a preferred castor angle of about 15 degrees. Of course, other caster angles could be used depending on a particular application.

The camber is preferably set up to be slightly positive. Accordingly, the inside tire preferably leans slightly more since It Is following a smaller radius. While traveling straight ahead, both tires will want to pull slightly to the outside but their forces should offset each other. At slower speeds (i.e. 1-5 mph), the rider will turn the steering to the right In order to turn the vehicle right. At speeds higher than that, the effect of counter steering kicks in and the rider must turn the steering to the left in order for the vehicle to go to the right.

More preferably, the linkages and their related mounting locations to the frame and left and right wheels are positioned so as to allow the camber between the left and right wheels to increase proportionally to the amount of tilt of the vehicle. This concept is discussed more fully in U.S. provisional patent application No. 62/239,905, filed on Oct. 10, 2015, the disclosure of which is hereby incorporated by reference.

The base concept of this proportionally increasing camber concept is similar to how Ackermann's steering works to give the proper steering angle to the two front wheels of a vehicle that always stay straight up and down. In addition to following Ackermann's steering principles, proportionally increasing the camber allows for proper lean angles so that the two wheels in the front of a vehicle achieve proper leaning angles while going around a corner.

Tilting vehicles need something similar to Ackerman's steering principle to allow the inside wheel to lean at more of an angle as the vehicle leans while going around a corner. A vehicle with a two wheeled tilting front end does not steer around a corner but actually turns by leaning and riding on the smaller radius of the curved tires diameter. As the vehicle goes down the road in a straight line, it is ideal to have the two front wheels parallel. The wheels will have 0 toe and 0 camber as the vehicle corners, it is ideal to have the inside wheel lean at more of an angle as it is following a tighter corner radius as compared to the outside wheel. Again, very similar to Ackerman's steering but applied to a leaning vehicle. In our example shown below on our tilting three wheeler, at 0 degree lean angle, Y is 0". At 45 degrees of lean angle, Y may be 0.25". X is approximately 36". The proper set-up allows Y to increase slightly as the vehicle leans. In other words, the geometry allows the camber to proportionally increase as the vehicle leans. If you do not have the correct geometries set to allow this difference, the wheels will scrub and cause premature wear on the tires. By allowing the tires to follow the natural lines that they want to follow, the tires wear evenly. The correct geometry is achieved by using our soon to be patented steering joint and positioning the tie rods in the appropriate position on our hubs located on the centerline of the wheel. By properly joining the tie rods to the hubs, the vehicle can achieve proper Ackermann's steering at slow speeds when the wheels are not leaned over and the proper geometry that allows the inside wheel to lean more than the outside wheel at speed. The variable geometry is also achieved by having the hubs leaned back slightly (defined as "rake" below) which gives the proper trail (see diagram below) to the front wheels.

Currently, unless supported by the driver's feet or by a kickstand, the vehicle 10 of the present invention remains free-leaning, like a motorcycle. Accordingly, it will tend to tilt sideways when operating at very slow speeds, when stopped, and when parked. Accordingly, it can fall-over, just like a motorcycle, unless supported by the rider or a kickstand.

If desired, the vehicle can be configured to reduce or eliminate free leaning when stopped or operated at slow speeds. For example, the front of the vehicle can be temporarily and automatically locked at a commanded, straight position at slow speeds and when stopped with no pivoting allowed along pivots 24 and 26. An exemplar control logic 306 for activation of the tilting lock is shown schematically in FIG. 7.

Figure 21A:
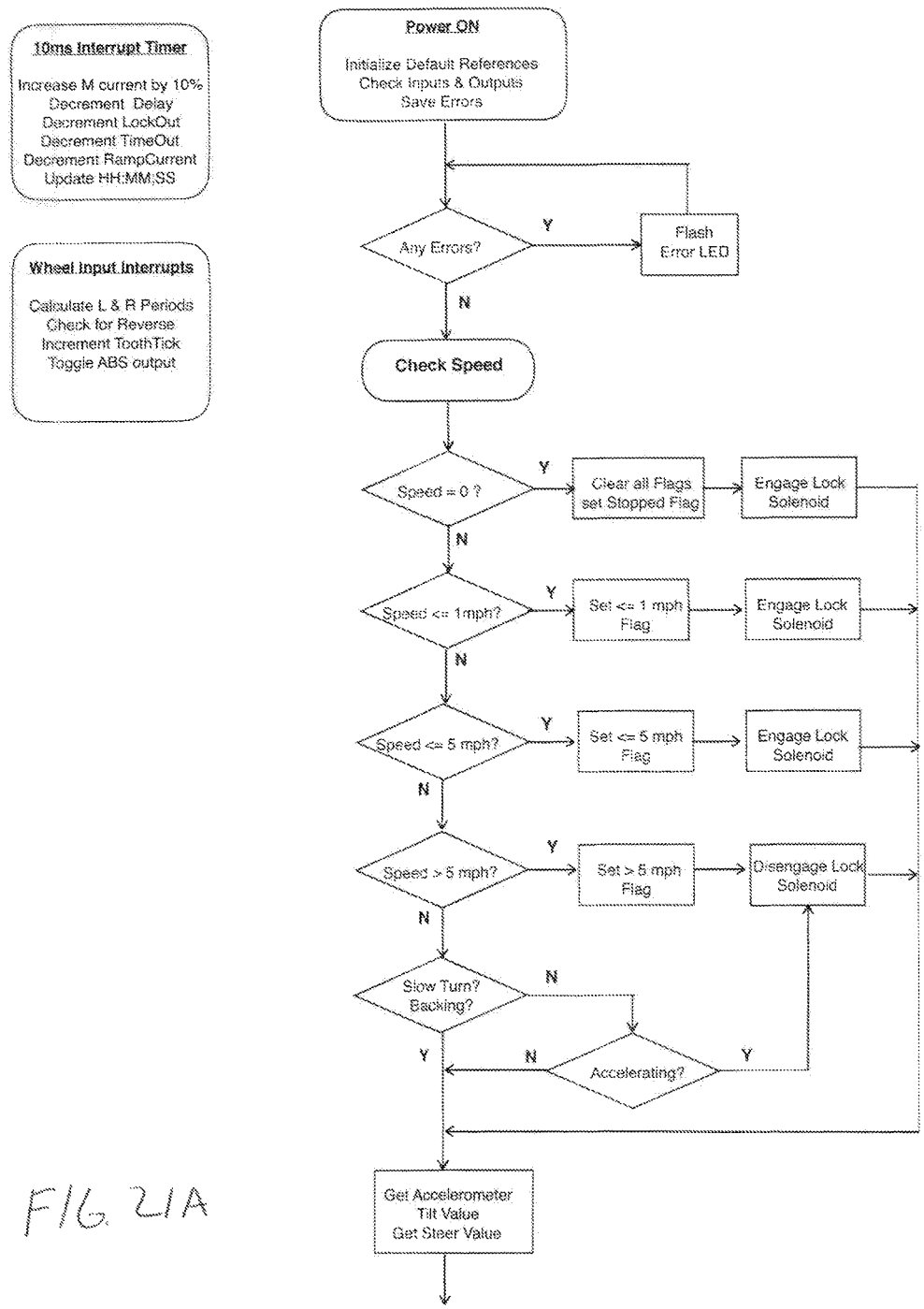
FIGS. 21 A-C is a flow chart of a possible tilt lock control logic in accordance with an embodiment of the present invention.
Figure 21B:
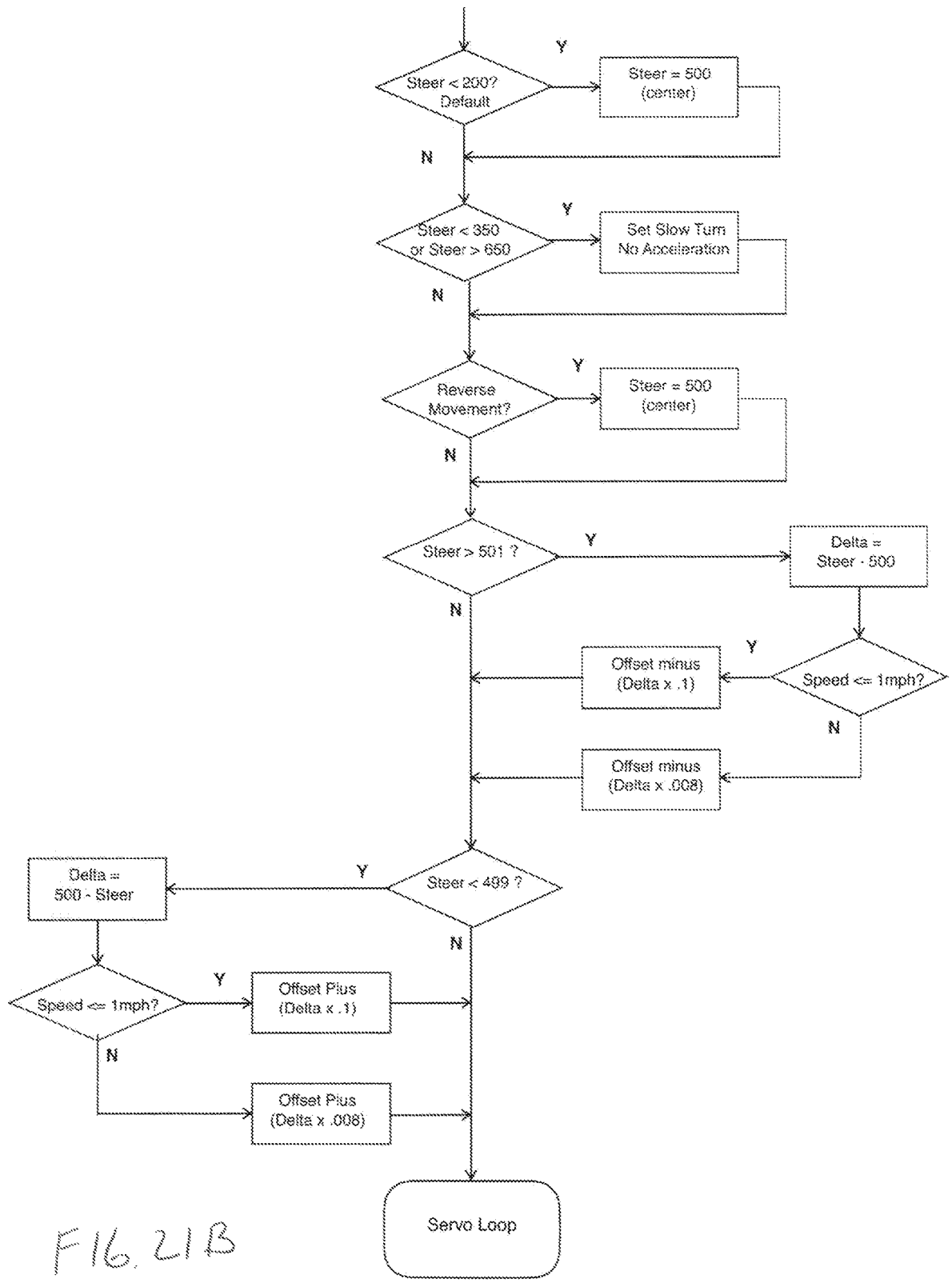
Figure 21C:
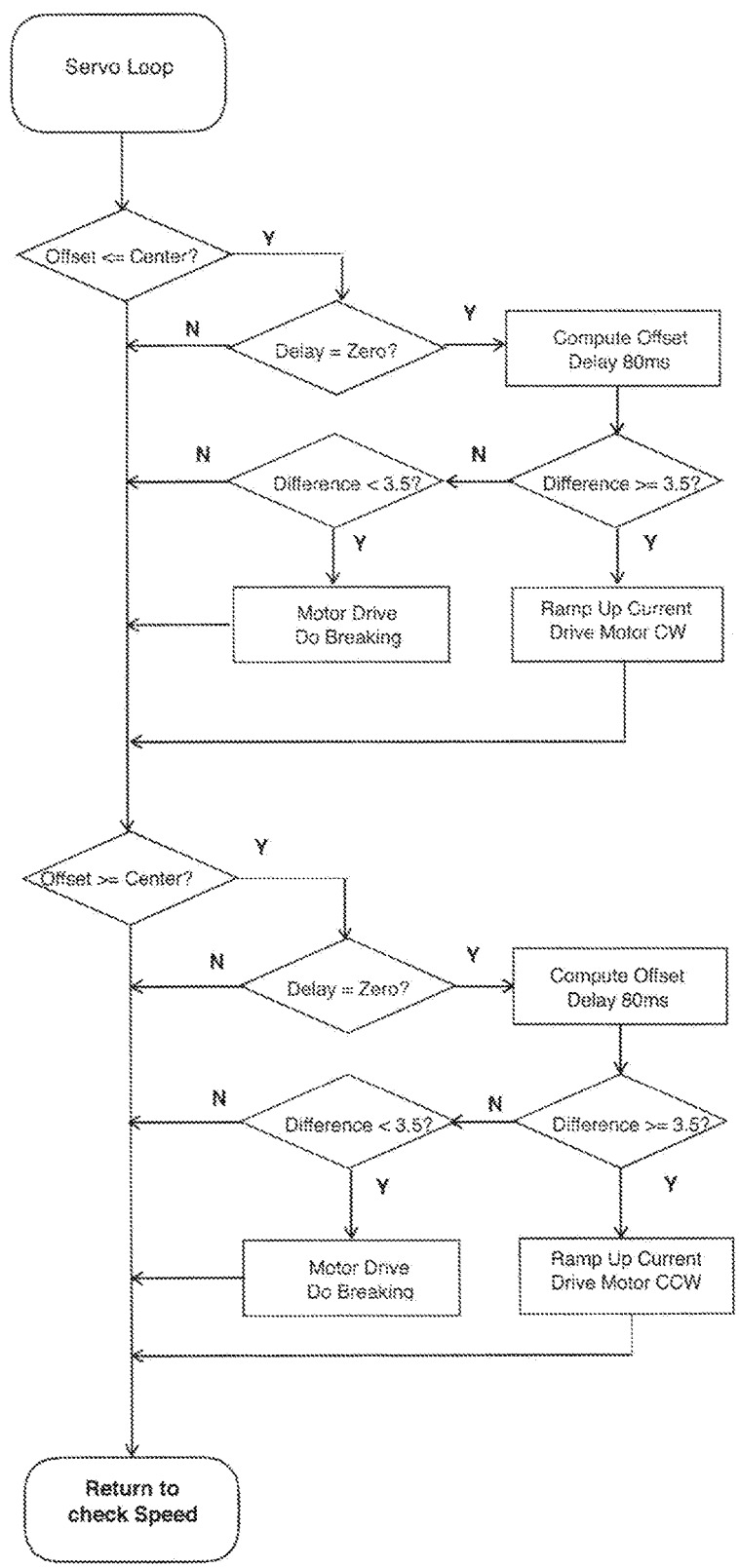

Alternative possible control logic configurations are shown schematically in FIGS. 21A-21C and shown and discussed in U.S. provisional patent application No. 62/239,900 filed on Oct. 10, 2015, the disclosure of which is hereby incorporated by reference.

The Tilt Lock system is designed to lock the bike so that it doesn't lean at low speeds or when stopped and will bring the bike vertical if off centered. Once the bike starts to accelerate or gets above a certain speed the lock will release and allow the bike to lean freely. Riders can enjoy the handling of a 2-wheeled motorcycle without having to support the bike when stopped.

There is a low speed setting (around 1 mph) where this system is always locked and there is a high speed setting (around 7 mph) where the system is always off. Between the high speed and low speed setting, the system is either locked or unlocked depending if the bike is accelerating or deaccelerating.

Once the bike is locked, the program goes into a looping program sensing whether the bike is level or not to the horizon, if it is not level, it activates the hydraulic motor which drives the hydraulic cylinders to level the bike. This happens continuously until the system is unlocked. Leveling the bike perpendicular to the horizon rather than perpendicular to the road surface is the natural state the rider wants to be in.

If the handle bars are turned sharp enough beyond a certain setting, the system will always stay locked up to the high speed setting. This allows the rider to make sharp U-turns at less than the high speed setting without having to worry about the bike unlocking.

When the bike is less than 1 mph (or so) steering input will slightly lean the bike. At a stop, or less than 1 mph, if you turn your handlebars to the right, the bike will slightly lean to the right. This function preleans the bike to assist the rider in making an immediate turn to the right or left from a stop. The more you turn the handlebars, the more the bike is leaned over. The proportion of the turning to the lean can be fixed or variable. If you don't have this function and the bike is locked vertical, and you make an immediate hard right turn and the system switches from locked to unlock, it will cause the bike to be thrown to the outside of the corner and is very disconcerting to the rider. By having the bike preleaned, the bike and rider follow the natural leaning path the bike wants to take.

Exemplar General System and Environmental Requirements:
1) Operating voltage 12V+/−
2) Operating temperature: −30° to +150° Fahrenheit
3) Board protected against overload, short-circuit, reverse polarity and power surge
4) Dual board design for redundancy.
5) Will need to be robust enough to handle extreme vibration and wet weather conditions Inputs:
1) Inputs for two quadrature sensors Honeywell X209356-GT (see attached spec sheet for SNG-Q sensors)
2) On-board accelerometer for tilt sensing (looking at using attached Bosch units)
3) May use same or separate accelerometer for Acceleration and Deceleration measurements
4) One 0-5V input for the Honeywell RTY120HVNAX sensor for steering (see attached RTY spec sheet)
5) On/off switch Outputs:
1) One solenoid output max 1.5 A (see attached spec for Sun Coil)
2) Output for one motor, reversible, max 20 A driving hydraulic pump. Currently using Parker Oildyne 118AES10-ALL-1V-20-20 unit with two wire motor, could look at 118AMS10-ALL-1V-20-20 unit with three wire motor. See attached spec for Parker Hydraulic Unit
3) Error indicator bulb or display (need to determine fault state)
4) Indicator showing bike is stopped and solenoid is activated Such control systems for detecting speed and activating a controller to limit movement are known. For example, the speed control could be activated by a connection to a traditional speedometer measuring the rotation of the wheel since the vehicle would Jock up anytime the brakes were applied hard enough to lock up the wheels. Alternatively, vehicle speed can be monitored, by an on-board GPS system, a radar system, a radio frequency transmission system or the like that would measure the vehicle's true speed and apply a mechanical lock 300 (FIG. 18) once the speed of the vehicle reaches less than say 3 mph. An exemplar mechanical lock 300 featuring a hydraulic brake 302 operably secured between the vehicle frame and the tilting linkage is shown in FIG. 18. Within FIG. 18, mechanical lock 300 forms a hydraulic disk tilt lock structure of the hydraulic brake 302 and a disk 304. With such a system installed, the driver would not have to put his or her feet on the ground once the vehicle came to a stop.

Moreover, the tilting linkage 14 and 14' can include a frame portion 130 adapted to fit onto the front end of a conventional in-line two-wheeled vehicle such as a conventional motor cycle or the like. Such frame would include conventional fittings and the like to allow the steering shaft 30 to connect to the existing handlebar system of the conventional in-line two-wheeled vehicle.

In view of the wide variety of embodiments to which the principles of the invention can be applied, it should be apparent that the detailed embodiments are illustrative only and should not be taken as limiting the scope of the invention. For example, although the disclosed embodiment positions the pair of wheels 12a, 12b on the front of the vehicle, the principles of this Invention would also work with the pair of wheels 12a, 12b replacing the rear wheel of an in-line two-wheeled vehicle. Similarly, a four-wheeled vehicle with one or both of the pairs of wheels configured as described could also operate effectively. Rather, the claimed invention includes all such modifications as may come within the scope of the claims and equivalents thereto.

A tilting wheeled vehicle is disclosed having: an elongate frame defining a frame plane extending substantially vertically along a longitudinal centerline of said frame, said frame tiltable from side-to-side defining a range of movement of said frame; a tilting linkage operably secured to the frame, said tilting linkage operably securing a first wheel and a second wheel spaced apart from and aligned substantially parallel to said first wheel; said first wheel pivotally secured to said linkage defining a first pivot axis and having a substantially vertical longitudinal centerline defining a first wheel plane that intersects said substantially vertical longitudinal centerline, said first pivot axis substantially intersecting said first wheel plane; said second wheel pivotally secured to said linage defining a second pivot axis and having a second substantially vertical longitudinal centerline defining a second wheel plane that intersects said intersects said second substantially vertical longitudinal centerline, said second pivot axis substantially intersecting said second wheel plane; said first steering axis and said second steering axis aligned substantially parallel to said frame plane through said range of movement of said frame; a universal steering linkage operably secured to the first and second wheel to allow uniform steering forces throughout a defined tilting range of motion of the vehicle; a tilting lock system that prevents the vehicle from tilting based on predetermined criteria; and, said tilting linkage providing a proportionally increasing camber between the first and second wheel as tilting of the vehicle increases. The frame has a front, a back, a left side, and a right side and said frame is tiltable so that said frame plane may tilt in the direction between said left side and said right side, and further including: a rear wheel operably secured toward the back of said frame; said tilting linkage is operably secured toward the front of said frame thereby defining a tilting three-wheeled vehicle. The tilting linkage includes: a substantially horizontal first pivot operably secured to the frame substantially near said longitudinal centerline of said frame; a substantially horizontal second pivot operably secured to the frame substantially near said longitudinal center line of said frame; said first and second pivots spaced apart from each other with said first pivot positioned substantially vertically above said second pivot; an upper arm pivotally secured to said first pivot and having a first distal end; a lower arm pivotally secured to said second pivot and having a second distal end; a kingpin extending between said upper arm and said lower and toward said first and second distal ends, said kingpin aligned substantially parallel to the frame plane of the vehicle; and, a wheel operably secured to said kingpin. The upper arm has an opposite third distal end and said lower arm as an opposite fourth distal end, and further including: a second kingpin extending between said upper arm and said lower arm toward said third and fourth distal ends, said second kingpin aligned substantially parallel to the frame plane of the vehicle and said first kingpin; and, a second wheel operably secured to said second kingpin. The vehicle can be a conventional motorcycle and said linkage is detachably secured to said motorcycle. The vehicle further includes a steering shaft operably secured to said frame, said steering shaft aligned substantially parallel to said frame plane. The vehicle further includes a handle bar operably secured to said steering shaft, and a steering linkage extending between said steering rod and said first and second wheels so as to allow a rider to turn said first and second wheels about said first and second kingpins, respectively, by turning the handle bar about said steering shaft thereby steering the vehicle. The vehicle further includes a suspension system operably secured to said linkage. The suspension system includes a compression spring operably positioned between said first wheel and said kingpin. The tilting linkage includes: a substantially horizontal first pivot operably secured to the frame substantially near said longitudinal centerline of said frame; a substantially horizontal second pivot operably secured to the frame substantially near said longitudinal centerline of said frame; said first and second pivots spaced apart from each other with said first pivot positioned substantially vertically above said second pivot; a first upper arm pivotally secured to said first pivot and having a first distal end; a first lower arm pivotally secured to said second pivot and having a second distal end; a first kingpin extending between said first upper arm and said first lower arm toward said first and second distal ends, said first kingpin aligned substantially parallel to the frame plane of the vehicle; said first wheel operably secured to said first kingpin; a second upper arm pivotally secured to said first pivot and having a third distal end; a second lower arm pivotally secured to said second pivot and having a fourth distal end; a second kingpin extending between said second upper arm and said second lower arm toward said third and fourth distal ends, said second kingpin aligned substantially parallel to the frame plane of the vehicle; and said second wheel operably secured to said first kingpin. The vehicle further includes a suspension system operably connected to said linkage. The suspension system is operably connected to said first upper and said second upper arm.

The invention claimed is:

1. A tilting wheeled vehicle, comprising:
   a frame tiltable side-to-side within a tilting range of motion of the frame;
   a right wheel defining a first wheel plane that intersects the right wheel;
   a left wheel defining a second wheel plane that intersects the left wheel;
   a steering system operable to allow uniform steering forces throughout the tilting range of motion of the frame, the steering system including:
   a tilting linkage including an upper portion having right and left upper cross members operably secured to the frame at a shared upper pivot, and a lower portion having right and left lower cross members operably secured to the frame at a shared lower pivot;
   a right kingpin having the right wheel mounted thereto and pivotally secured to the right upper cross member and the right lower cross member of the tilting linkage at the first wheel plane to define a first steering axis of the right wheel;
   a left kingpin operatively secured to the left wheel mounted thereto and pivotally secured to the left upper cross member and the left lower cross member of the tilting linkage at the second wheel plane to define a second steering axis of the left wheel; and
   a universal steering linkage secured to a steering shaft along a frame plane that also includes the shared upper pivot and the shared lower pivot, the universal steering linkage including a right tie rod and a left tie rod that are pivotable independent of each other, wherein the right tie rod is operably secured to the right kingpin, and the left tie rod is operably secured to the left kingpin.

2. The tilting wheeled vehicle of claim 1, wherein said frame has a front, a back, a left side, and a right side and said frame is tiltable so that said frame plane is tiltable in the direction between said left side and said right side, and the tilting wheeled vehicle further including:
   a rear wheel operably secured toward the back of said frame;
   said tilting linkage is operably secured toward the front of said frame.

3. The tilting wheeled vehicle of claim 2, wherein the shared upper pivot and the shared lower pivot of said tilting linkage are located along a longitudinal centerline of said frame when the frame is not tilted side-to-side;
   the shared upper pivot and the shared lower pivot being spaced apart from each other in a vertical dimension.

4. The tilting vehicle of claim 1, wherein said steering shaft is aligned substantially parallel to said frame plane.

5. The tilting vehicle of claim 4, further including a handle bar operably secured to said steering shaft so as to allow a rider to turn said right and left wheels about said right and left kingpins, respectively, by turning the handle bar about said steering shaft to thereby steer the vehicle.

6. The tilting vehicle of claim 1, further including a suspension system operably secured to said tilting linkage.

7. The tilting vehicle of claim 6, wherein said suspension system includes a respective compression spring operably positioned between each of: the right wheel and the right kingpin, and the left wheel and the left kingpin.

8. The tilting wheeled vehicle of claim 6, wherein said suspension system is operably connected to said right and left upper cross members.

9. The tilting wheeled vehicle of claim 1, wherein the first wheel plane at which the right kingpin is pivotally secured to the right upper cross member and the right lower cross member bisects the right wheel; and
   wherein the second wheel plane at which the left kingpin is pivotally secured to the left upper cross member and the left lower cross member bisects the left wheel.

10. The tilting wheeled vehicle of claim 1, further comprising:
    a tilting lock system that prevents the frame from tilting based on a predetermined criteria.

11. The tilting wheeled vehicle of claim 10, wherein the predetermined criteria includes a speed range of the vehicle.

12. The tilting wheeled vehicle of claim 10, wherein the predetermined criteria includes an acceleration or deceleration of the vehicle.

13. The tilting wheeled vehicle of claim 1, wherein the steering system provides a proportionally increasing camber between the right wheel and the left wheel as a tilting of the frame of the vehicle increases relative to a vertical plane.

\* \* \* \* \*